(12) United States Patent
Ono

(10) Patent No.: US 10,863,164 B2
(45) Date of Patent: Dec. 8, 2020

(54) STEREO CAMERA AND METHOD OF CONTROLLING STEREO CAMERA

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 61 days.

(21) Appl. No.: 16/183,757

(22) Filed: Nov. 8, 2018

(65) Prior Publication Data

US 2019/0075284 A1 Mar. 7, 2019

Related U.S. Application Data

(63) Continuation of application No. PCT/JP2017/009859, filed on Mar. 13, 2017.

(30) Foreign Application Priority Data

May 17, 2016 (JP) ................................ 2016-098915

(51) Int. Cl.
*H04N 13/239* (2018.01)
*G01C 3/06* (2006.01)
(Continued)

(52) U.S. Cl.
CPC ............. *H04N 13/239* (2018.05); *G01C 3/06* (2013.01); *G03B 15/00* (2013.01); *G03B 17/56* (2013.01);
(Continued)

(58) Field of Classification Search
None
See application file for complete search history.

(56) References Cited

U.S. PATENT DOCUMENTS 6,734,911 B1 * 5/2004 Lyons ................ H04N 5/232
348/340
9,386,209 B2 7/2016 Kim et al.
(Continued)

FOREIGN PATENT DOCUMENTS

CN 104811683 7/2015
CN 105474626 4/2016
(Continued)

OTHER PUBLICATIONS

"Written Opinion of the International Searching Authority (Form PCT/ISA/237) of PCT/JP2017/009859," dated May 30, 2017, with English translation thereof, pp. 1-10.
(Continued)

*Primary Examiner* — Kaitlin A Retallick
(74) *Attorney, Agent, or Firm* — JCIPRNET

(57) ABSTRACT

A first wide angle image, a second wide angle image, a first telephoto image, and a second telephoto image are acquired from a first imaging unit $11_L$ and a second imaging unit $11_R$ at the same time, and particularly, optical axes of the wide angle optical system and the telephoto optical system constituting the first imaging optical system $12_L$ match each other, and the second imaging optical system is similarly configured, and therefore, it is possible to position the main subject at a center position of the first telephoto image and the second telephoto image by independently performing pan and tilt control on the first and the second imaging unit so that the main subject is captured on the respective optical axes of the first imaging optical system and the second imaging optical system on the basis of the first wide angle image and the second wide angle image.

15 Claims, 15 Drawing Sheets

(51) Int. Cl.
*H04N 5/232* (2006.01)
*G03B 19/07* (2006.01)
*G03B 35/08* (2006.01)
*G03B 17/56* (2006.01)
*G03B 15/00* (2006.01)
*H04N 7/18* (2006.01)
*H04N 13/20* (2018.01)
*H04N 13/296* (2018.01)

(52) U.S. Cl.
CPC ............ *G03B 19/07* (2013.01); *G03B 35/08* (2013.01); *H04N 5/23203* (2013.01); *H04N 5/23212* (2013.01); *H04N 5/23299* (2018.08); *H04N 5/232121* (2018.08); *H04N 7/18* (2013.01); *H04N 13/20* (2018.05); *H04N 13/296* (2018.05); *H04N 5/232123* (2018.08)

(56) References Cited

U.S. PATENT DOCUMENTS

| | | | |
|---|---|---|---|
| 10,165,181 | B2 | 12/2018 | Ono |
| 2005/0069195 | A1* | 3/2005 | Uezono ................ G06T 7/97 382/154 |
| 2006/0187312 | A1 | 8/2006 | Labaziewicz et al. |
| 2008/0117326 | A1 | 5/2008 | Nishio |
| 2009/0135502 | A1 | 5/2009 | Border et al. |
| 2013/0242409 | A1 | 9/2013 | Nishio et al. |
| 2014/0168498 | A1* | 6/2014 | Ono ..................... H04N 5/3696 348/335 |
| 2016/0005180 | A1 | 1/2016 | Matono et al. |
| 2016/0323504 | A1 | 11/2016 | Ono |

FOREIGN PATENT DOCUMENTS

| | | | |
|---|---|---|---|
| JP | 2008129454 | | 6/2008 |
| JP | 2011505022 | | 2/2011 |
| JP | 2011109630 | | 6/2011 |
| JP | 2012109733 | | 6/2012 |
| JP | 2012247645 | | 12/2012 |
| JP | 2015154386 | | 8/2015 |
| JP | 2016045170 | A * | 4/2016 |
| WO | 2014132748 | | 9/2014 |
| WO | 2016047220 | | 3/2016 |

OTHER PUBLICATIONS

"International Search Report (Form PCT/ISA/210) of PCT/JP2017/009859," dated May 30, 2017, with English translation thereof, pp. 1-5.

"Search Report of Europe Counterpart Application", dated Apr. 8, 2019, p. 1-p. 11.

Office Action of China Counterpart Application, with English translation thereof, dated Feb. 3, 2019, pp. 1-18.

* cited by examiner

STEREO CAMERA AND METHOD OF CONTROLLING STEREO CAMERA

CROSS-REFERENCE TO RELATED APPLICATIONS

This application is a Continuation of PCT International Application No. PCT/JP2017/009859 filed on Mar. 13, 2017, which claims priority under 35 U.S.C § 119(a) to Patent Application No. 2016-098915 filed in Japan on May 17, 2016, all of which are hereby expressly incorporated by reference into the present application.

BACKGROUND OF THE INVENTION

1. Field of the Invention

The present invention relates to a stereo camera and a method of controlling the stereo camera, and more particularly to, a technology capable of capturing a wide angle image which is a stereo image and a telephoto image which is a stereo image at the same time.

2. Description of the Related Art

In the related art, a panhead device for a plurality of camera systems having a plurality (four) of cameras mounted thereon has been proposed (JP2011-109630A).

The panhead device for a plurality of camera systems disclosed in JP2011-109630A includes two first panhead means (child panhead) having two compound-eye camera units mounted thereon and capable of controlling each compound-eye camera unit in a pan direction and a tilt direction, and second panhead means (a parent panhead) having the two first panhead means (two compound-eye camera units) mounted thereon and capable of controlling the two compound-eye camera units in the pan direction or the tilt direction, and the two compound-eye camera units are mounted to be spaced on the second panhead.

Each compound-eye camera unit includes a wide angle lens camera and a zoom camera, and an optical axis of the wide angle lens camera and the optical axis of the zoom camera are directed in the same direction by default.

Since the zoom lens camera is directed in the same optical axis direction as the wide angle lens camera, it is possible to zoom up details of a subject within an angle of view of the wide angle lens and capture a detailed telephoto image. Further, the panhead device for a plurality of camera systems controls the second panhead means toward the captured subject, such that the device directly can face the subject and the device can capture the subject and measure a distance between the device and the subject using a triangulation method at a point of time at which the device directly faces the subject.

On the other hand, an automatic tracking imaging device capable of acquiring a wide angle image and a telephoto image at the same time using a single imaging unit including a wide angle optical system and a telephoto optical system of which optical axes match each other and reliably capturing an object that is a tracking target in a telephoto image has been proposed (JP2015-154386A).

An automatic tracking imaging device described in JP2015-154386A includes a central optical system that is a wide angle optical system disposed on a common optical axis, an imaging optical system including an annular optical system that is a telephoto optical system, a directivity sensor that pupil-divides and selectively receives a light beam incident via the wide angle optical system and the telephoto optical system, a pan and tilt mechanism, an object detection unit that detects an object that is a tracking target on the basis of at least a wide angle image between the wide angle image and the telephoto image acquired from the directivity sensor, and a pan and tilt control unit that controls the pan and tilt mechanism on the basis of position information of the object in the image detected by the object detection unit.

Since the automatic tracking imaging device described in JP2015-154386A can acquire a wide angle image and a telephoto image at the same time using a single imaging unit including the wide angle optical system and the telephoto optical system of which optical axes match each other, it is possible to reduce a size and a cost of the device. Further, since the optical axes of the wide angle optical system and the telephoto optical system match each other, the object can be put in the telephoto image (automatically tracked) by detecting the object that is a tracking target on the basis of at least the wide angle image and controlling the pan and tilt mechanism on the basis of the position information of the detected object in the image and the object can be captured using the wide angle image even in a case where the object moves at high speed. Thus, tracking deviation does not occur.

SUMMARY OF THE INVENTION

Since the panhead device for a plurality of camera systems described in JP2011-109630A includes the two compound-eye camera units (two wide angle lens cameras and two zoom cameras) mounted thereon, it is possible to capture two wide angle images that are stereo images and two telephoto images that are stereo images at the same time. However, there is a problem in that a size increases since each compound-eye camera unit includes the wide angle lens camera and the zoom camera.

The optical axis of the wide angle lens camera and the optical axis of the zoom camera constituting the compound-eye camera unit are directed in the same direction, but the optical axes of both are parallel and do not match. Therefore, there is a problem in that, in a case where the wide angle lens camera captures a subject (a main subject) on the optical axis, and the zoom camera is zoomed up to image details of the main subject, the main subject is imaged at a position deviating from a center (the optical axis of the zoom camera) of a zoomed-up telephoto image, and in a case where a zoom magnification of the zoom camera is a high magnification, the main subject is out of the angle of view of the zoom camera and the main subject cannot be captured by the zoom camera.

On the other hand, the automatic tracking imaging device described in JP2015-154386A can acquire the wide angle image and the telephoto image at the same time using the single imaging unit having the wide angle optical system and the telephoto optical system of which optical axes match each other. Accordingly, in a case where the pan and tilt mechanism is controlled so that the object that is a tracking target is captured at a center of the wide angle image, it is possible to capture the object that is a tracking target at the center of the telephoto image. However, it is not possible to acquire distance information or the like of the main subject, and it is not possible to apply an automatic focus adjustment method for causing the zoom camera to be focused on the main subject on the basis of the distance information of the main subject.

The present invention has been made in view of such circumstances, and an object of the present invention is to provide a stereo camera and a method of controlling the stereo camera capable of acquiring two wide angle images which are a stereo image and two telephoto images which are a stereo image at the same time and reliably capturing a main subject at optical axes of two telephoto optical systems, particularly, in a case where the two telephoto images are acquired.

To achieve the above object, a stereo camera according to an aspect of the present invention includes a first imaging unit including a first imaging optical system including a wide angle optical system and a telephoto optical system having optical axes matching each other and disposed in different regions, and a first directivity sensor having a plurality of pixels that pupil-divide and selectively receive a light beam incident via the wide angle optical system and the telephoto optical system; a second imaging unit including a second imaging optical system having the same configuration as the first imaging optical system and a second directivity sensor having the same configuration as the first directivity sensor, the second imaging unit being disposed to be spaced from the first imaging unit by a baseline length; an image acquisition unit that acquires a first wide angle image and a second wide angle image, and a first telephoto image and a second telephoto image from the first directivity sensor and the second directivity sensor; a pan and tilt mechanism that rotationally moves the first imaging unit and the second imaging unit in a horizontal direction and a vertical direction; a pan and tilt control unit that controls the pan and tilt mechanism on the basis of the first wide angle image and the second wide angle image acquired by the image acquisition unit so that a main subject is captured on the respective optical axes of the first imaging optical system and the second imaging optical system; and a distance information calculation unit that calculates at least distance information of the main subject on the basis of the first telephoto image and the second telephoto image acquired by the image acquisition unit.

According to an aspect of the present invention, the first imaging unit and the second imaging unit, which are disposed to be spaced from each other by the baseline length can be rotationally moved in the horizontal direction and the vertical direction by the pan and tilt mechanism. The first imaging unit includes the first imaging optical system including the wide angle optical system and the telephoto optical system having optical axes matching each other and disposed in different regions, and the first directivity sensor having the plurality of pixels that pupil-divide and selectively receive the light beam incident via the wide angle optical system and the telephoto optical system, and the second imaging unit includes the second imaging optical system and the second directivity sensor, similar to the first imaging unit.

The first wide angle image and the second wide angle image that are stereo images, and the first telephoto image and the second telephoto image that are stereo images can be acquired at the same time from the first imaging unit and the second imaging unit, and particularly, the optical axes of the wide angle optical system and the telephoto optical system constituting the first imaging optical system match each other and, similarly, the optical axes of the wide angle optical system and the telephoto optical system constituting the second imaging optical system match each other. Therefore, by controlling the pan and tilt mechanism to capture the main subject on the respective optical axes (a cross point at which the optical axes cross) of the first imaging optical system and the second imaging optical system on the basis of the first wide angle image and the second wide angle image, it is possible to position the main subject at a center position (a position corresponding to the optical axis) of the first telephoto image and the second telephoto image. Further, since the pan and tilt mechanism is controlled on the basis of the first wide angle image and the second wide angle image, it is possible to reliably capture the main subject without losing sight.

Further, since the first telephoto image and the second telephoto image are captured as stereo images, it is possible to calculate the distance information of the main subject, but since the first telephoto image and the second telephoto image have a higher spatial resolution than that of the first wide angle image and the second wide angle image, it is possible to calculate high-accuracy distance information.

In the stereo camera according to another aspect of the present invention, it is preferable for the distance information calculation unit to include a correspondence point detection unit that detects two correspondence points of which feature quantities match each other on the basis of the first telephoto image and the second telephoto image, and to calculate a distance of the correspondence point on the basis of the amount of parallax in the first directivity sensor and the second directivity sensor of the two correspondence points detected by the correspondence point detection unit, the baseline length, an optical axis direction of the first imaging optical system and the second imaging optical system, and a focal length of the telephoto optical system.

Accordingly, it is possible to also calculate not only the distance information of the main subject on the respective optical axes of the first imaging optical system and the second imaging optical system, but also the distance information of the subject of which the correspondence points have been detected from the first telephoto image and the second telephoto image.

In the stereo camera according to still another aspect of the present invention, it is preferable for the first imaging optical system and the second imaging optical system to include the wide angle optical system including a circular central optical system, and the telephoto optical system including an annular optical system disposed concentrically with the central optical system. A parallax is not generated between the two images captured by the wide angle optical system including the circular central optical system and the telephoto optical system including the annular optical system disposed concentrically with the central optical system, and the optical systems are rotationally symmetric. Thus, it is preferable for the optical systems to be adopted as imaging optical systems.

In the stereo camera according to still another aspect of the present invention, the first directivity sensor and the second directivity sensor each can include a microlens array or a light shielding mask that functions as pupil division unit.

It is preferable for the stereo camera according to still another aspect of the present invention to further include a first focus adjustment unit that performs focus adjustment of the respective telephoto optical systems of the first imaging optical system and the second imaging optical system. Since the telephoto optical system includes a shallower depth of field than the wide angle optical system and it is easy for blurring to occur, it is preferable to perform the focus adjustment.

In the stereo camera according to still another aspect of the present invention, it is preferable for the first focus adjustment unit to acquire distance information of the main subject on the basis of the amount of parallax in the first directivity sensor and the second directivity sensor of the main subject included in the first wide angle image and the second wide angle image acquired by the image acquisition unit, the baseline length, the optical axis directions of the first imaging optical system and the second imaging optical system, and a focal length of the wide angle optical system, and perform focus adjustment of the respective telephoto optical systems of the first imaging optical system and the second imaging optical system on the basis of the acquired distance information.

It is possible to acquire the distance information of the main subject using a triangulation method from the first wide angle image and the second wide angle image that are stereo images. The movement position in the optical axis direction of all or some of the respective telephoto optical systems of the first imaging optical system and the second imaging optical system and the distance information of the subject focused according to the movement position are in one-to-one correspondence. Accordingly, in a case where the distance information of the main subject can be acquired, it is possible to perform the focus adjustment of the respective telephoto optical systems of the first imaging optical system and the second imaging optical system so that the optical systems are focused on the main subject.

In the stereo camera according to still another aspect of the present invention, it is preferable that when the pan and tilt mechanism is controlled by the pan and tilt control unit and the main subject is captured on the respective optical axes of the first imaging optical system and the second imaging optical system, the first focus adjustment unit acquires the distance information of the main subject on the basis of the baseline length, the optical axis directions of the first imaging optical system and the second imaging optical system, and the focal length of the wide angle optical system, and performs focus adjustment of the respective telephoto optical systems of the first imaging optical system and the second imaging optical system on the basis of the acquired distance information.

In a case where the main subject is captured on the respective optical axes of the first imaging optical system and the second imaging optical system, the amount of parallax in the first directivity sensor and the second directivity sensor of the main subject is 0. Thus, it is possible to calculate the distance information of the main subject using a triangulation method on the basis of the baseline length, the optical axis directions of the first imaging optical system and the second imaging optical system, and the focal length of the wide angle optical system. Further, in a case where the distance information of the main subject can be acquired, it is possible to perform the focus adjustment of the respective telephoto optical systems of the first imaging optical system and the second imaging optical system so that the optical systems are focused on the main subject, similar to the above.

It is preferable for the stereo camera according to still another aspect of the present invention to include a first focus adjustment unit that performs focus adjustment of the respective telephoto optical systems of the first imaging optical system and the second imaging optical system; and a second focus adjustment unit that performs focus adjustment of the respective wide angle optical systems of the first imaging optical system and the second imaging optical system. The focus adjustment unit may not be provided in the wide angle optical system and the wide angle optical system may be pan focus, but it is preferable for the focus adjustment unit (the second focus adjustment unit) to be also provided in the wide angle optical system.

In the stereo camera according to still another aspect of the present invention, it is preferable for the first focus adjustment unit to acquire the distance information of the main subject on the basis of in-focus information of the wide angle optical system from the second focus adjustment unit, and perform focus adjustment of the respective telephoto optical systems of the first imaging optical system and the second imaging optical system on the basis of the acquired distance information. In a case where the second focus adjustment unit that performs focus adjustment of the wide angle optical system is included, it is possible to acquire the distance information of the main subject on the basis of in-focus information of the wide angle optical system after the focus adjustment (for example, the movement position in the optical axis direction of all or some of the wide angle optical system in an in-focus state). In a case where the distance information of the main subject can be acquired, it is possible to perform the focus adjustment of the respective telephoto optical systems of the first imaging optical system and the second imaging optical system so that the optical systems are focused on the main subject, similar to the above.

In the stereo camera according to still another aspect of the present invention, it is preferable for the pan and tilt mechanism to include a first pan and tilt mechanism that rotationally moves the first imaging unit in a horizontal direction and a vertical direction, and a second pan and tilt mechanism that rotationally moves the second imaging unit in a horizontal direction and a vertical direction independently of the first pan and tilt mechanism, and for the pan and tilt control unit to include a first pan and tilt control unit that controls the first pan and tilt mechanism on the basis of the first wide angle image, and a second pan and tilt control unit that controls the second pan and tilt mechanism on the basis of the second wide angle image.

Accordingly, it is possible to cause the first imaging unit and the second imaging unit to independently perform a pan and tilt operation, and to independently control the respective optical axis directions of the first imaging optical system and the second imaging optical system.

In the stereo camera according to still another aspect of the present invention, it is preferable for the pan and tilt mechanism to include a holding member that holds the first pan and tilt mechanism and the second pan and tilt mechanism, and a pan mechanism that rotationally moves the holding member in the horizontal direction, and the pan and tilt control unit to control the pan mechanism on the basis of the first wide angle image and the second wide angle image so that the first imaging unit and the second imaging unit directly face the main subject.

By rotationally moving the entire holding member holding the first pan and tilt mechanism and the second pan and tilt mechanism in the horizontal direction, a distance between the first imaging unit and the second imaging unit with respect to the main subject can be equidistant and the distance information of the main subject or the like can be calculated more accurately.

It is preferable for the stereo camera according to still another aspect of the present invention to further include a first subject detection unit and a second subject detection unit that detect the main subject on the basis of the first wide angle image and the second wide angle image, and for the pan and tilt control unit to control the pan and tilt mechanism on the basis of position information of the main subject in the first wide angle image and the second wide angle image detected by the first subject detection unit and the second subject detection unit so that the main subject is captured on the respective optical axes of the first imaging optical system and the second imaging optical system. It is easy to image the main subject so that the main subject is in the first wide angle image and the second wide angle image. In a case where the main subject is included in the first wide angle image and the second wide angle image, it is possible to control the pan and tilt mechanism so that the main subject is captured on the respective optical axes of the first imaging optical system and the second imaging optical system on the basis of the position information of the main subject (position information indicating the amount of displacement from the center of each wide angle image (an optical axis position)) in the first wide angle image and the second wide angle image. Thus, even in a case where the main subject is a moving body moving at high speed, it is possible to reliably capture the moving body using the first wide angle image and the second wide angle image, and therefore, tracking deviation does not occur.

In the stereo camera according to still another aspect of the present invention, it is preferable for the first subject detection unit and the second subject detection unit to detect a moving body on the basis of the first wide angle image and the second wide angle image successively acquired by the image acquisition unit, and set the detected moving body as the main subject. In a case where the main subject is a moving body, it is possible to detect a desired main subject through moving body detection.

In the stereo camera according to still another aspect of the present invention, it is preferable for the first subject detection unit and the second subject detection unit to recognize a specific subject on the basis of the first wide angle image and the second wide angle image and set the recognized specific subject as the main subject. For example, in a case where the specific subject is a person, it is possible to detect the main subject by recognizing the person or a face of the person.

It is preferable for the stereo camera according to still another aspect of the present invention to further include a third subject detection unit and a fourth subject detection unit that detect the main subject on the basis of the first telephoto image and the second telephoto image, and for the pan and tilt control unit to control the pan and tilt mechanism on the basis of the position information of the main subject in the first telephoto image and the second telephoto image detected by the third subject detection unit and the fourth subject detection unit, and control the pan and tilt mechanism on the basis of position information of the main subject in the first wide angle image and the second wide angle image detected by the first subject detection unit and the second subject detection unit in a case where the main subject cannot be detected by the third subject detection unit and the fourth subject detection unit.

In a case where it is possible to detect the main subject on the basis of the first telephoto image and the second telephoto image, the pan and tilt mechanism is controlled on the basis of the position information of the detected main subject in the first telephoto image and the second telephoto image. Thus, it is possible to control the respective optical axes of the first imaging optical system and the second imaging optical system with high precision. On the other hand, in a case where it is not possible to detect the main subject on the basis of the first telephoto image and the second telephoto image, the pan and tilt mechanism is controlled on the basis of the position information of the main subject in the first wide angle image and the second wide angle image detected on the basis of the first wide angle image and the second wide angle image. Thus, even in a case where the main subject is a moving body moving at high speed, it is possible to reliably capture the moving body using the first wide angle image and the second wide angle image, and therefore, tracking deviation does not occur.

A still another aspect of the present invention is a method of controlling a stereo camera using the stereo camera, the method includes: acquiring the first wide angle image and the second wide angle image from the first directivity sensor and the second directivity sensor; controlling the pan and tilt mechanism on the basis of the acquired first wide angle image and the acquired second wide angle image so that the main subject is captured on the respective optical axes of the first imaging optical system and the second imaging optical system; acquiring the first telephoto image and the second telephoto image from the first directivity sensor and the second directivity sensor in a state where the main subject is captured on the respective optical axes of the first imaging optical system and the second imaging optical system; and calculating at least distance information of the main subject on the basis of the acquired first telephoto image and the acquired second telephoto image.

According to the present invention, the first wide angle image and the second wide angle image that are stereo images, and the first telephoto image and the second telephoto image that are stereo images can be acquired at the same time, and particularly, the optical axes of the wide angle optical system and the telephoto optical system constituting the first imaging optical system match each other and, similarly, the optical axes of the wide angle optical system and the telephoto optical system constituting the second imaging optical system match each other. Therefore, by controlling the pan and tilt mechanism to capture the main subject on the respective optical axes of the first imaging optical system and the second imaging optical system on the basis of the first wide angle image and the second wide angle image, it is possible to position the main subject at the center position (the position corresponding to the optical axis) of the first telephoto image and the second telephoto image. Further, since the pan and tilt mechanism is controlled on the basis of the first wide angle image and the second wide angle image, it is possible to reliably capture the main subject without losing sight.

Further, since the first telephoto image and the second telephoto image are captured as stereo images, it is possible to calculate the distance information of the main subject, but since the first telephoto image and the second telephoto image have a higher spatial resolution than that of the first wide angle image and the second wide angle image, it is possible to calculate high-accuracy distance information.

BRIEF DESCRIPTION OF THE DRAWINGS

FIG. 7 is a diagram used to describe a method of calculating distance information of a main subject or the like.

DESCRIPTION OF THE PREFERRED EMBODIMENTS

Hereinafter, embodiments of a stereo camera and a method of controlling the stereo camera according to the present invention will be described with reference to the accompanying drawings.

<Appearance of Stereo Camera>

Figure 1:
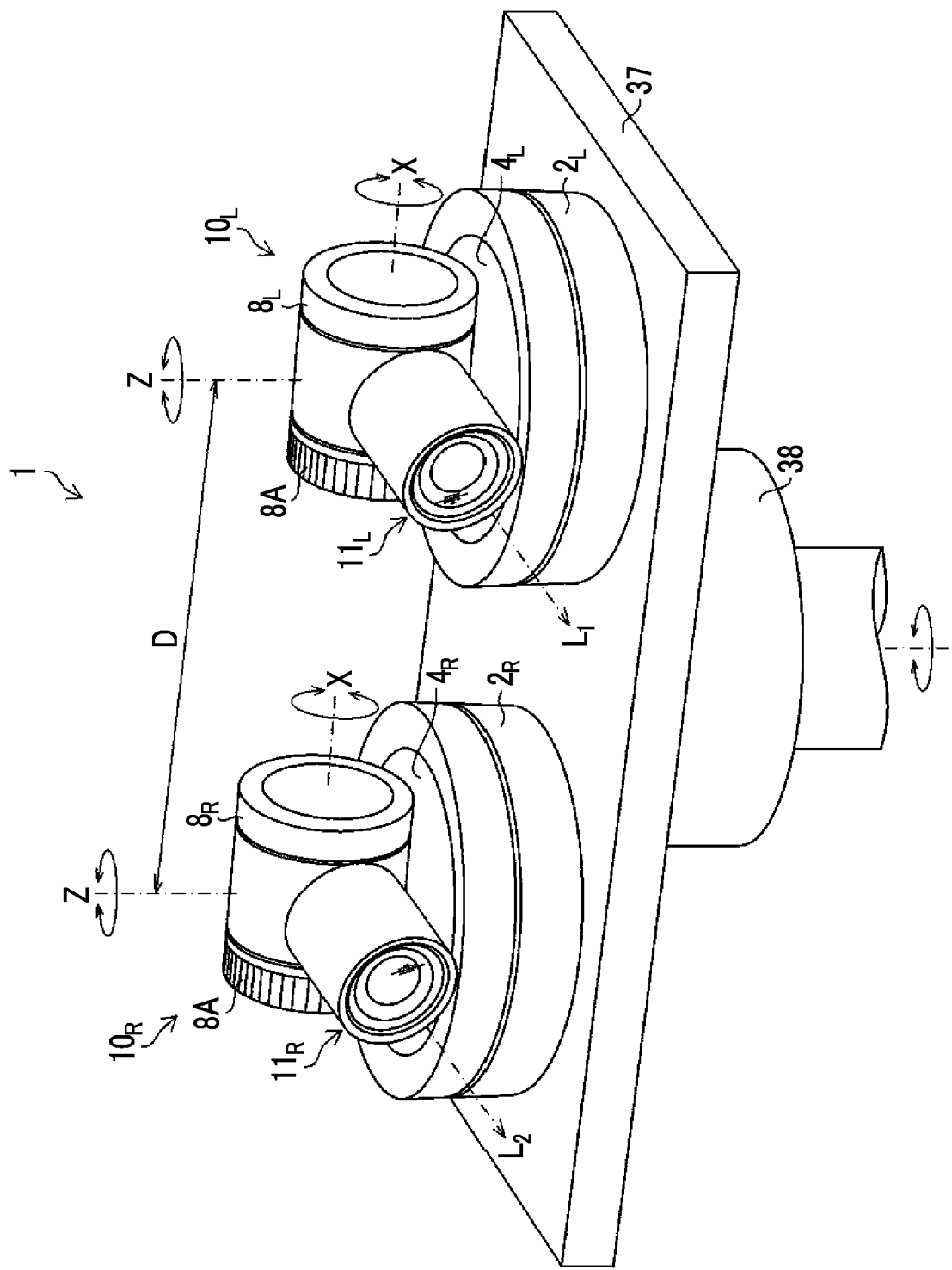
FIG. 1 is an external perspective view of a stereo camera according to the present invention.

FIG. 1 is an external perspective view of a stereo camera according to the present invention.

As illustrated in FIG. 1, the stereo camera 1 mainly includes a first pan and tilt camera $10_L$ for a left eye, a second pan and tilt camera $10_R$ for a right eye, a holding member 37 that holds the first pan and tilt camera $10_L$ and the second pan and tilt camera $10_R$ to be spaced from each other as baseline length D, and a pan device 38 including a pan mechanism that rotationally moves the holding member 37 in a horizontal direction.

The first pan and tilt camera $10_L$ includes a first imaging unit $11_L$, a first pan and tilt device $30_L$ (FIG. 4), and a first camera body $2_L$, and the second pan and tilt camera $10_R$ includes a second imaging unit $11_R$, a second pan and tilt device $30_R$ (FIG. 4), and a second camera body $2_R$.

The first pan and tilt device $30_L$ includes a base $4_L$, and a holding unit $8_L$ fixed to the base $4_L$ and holding the first imaging unit $11_L$ rotationally movably.

Figure 4:
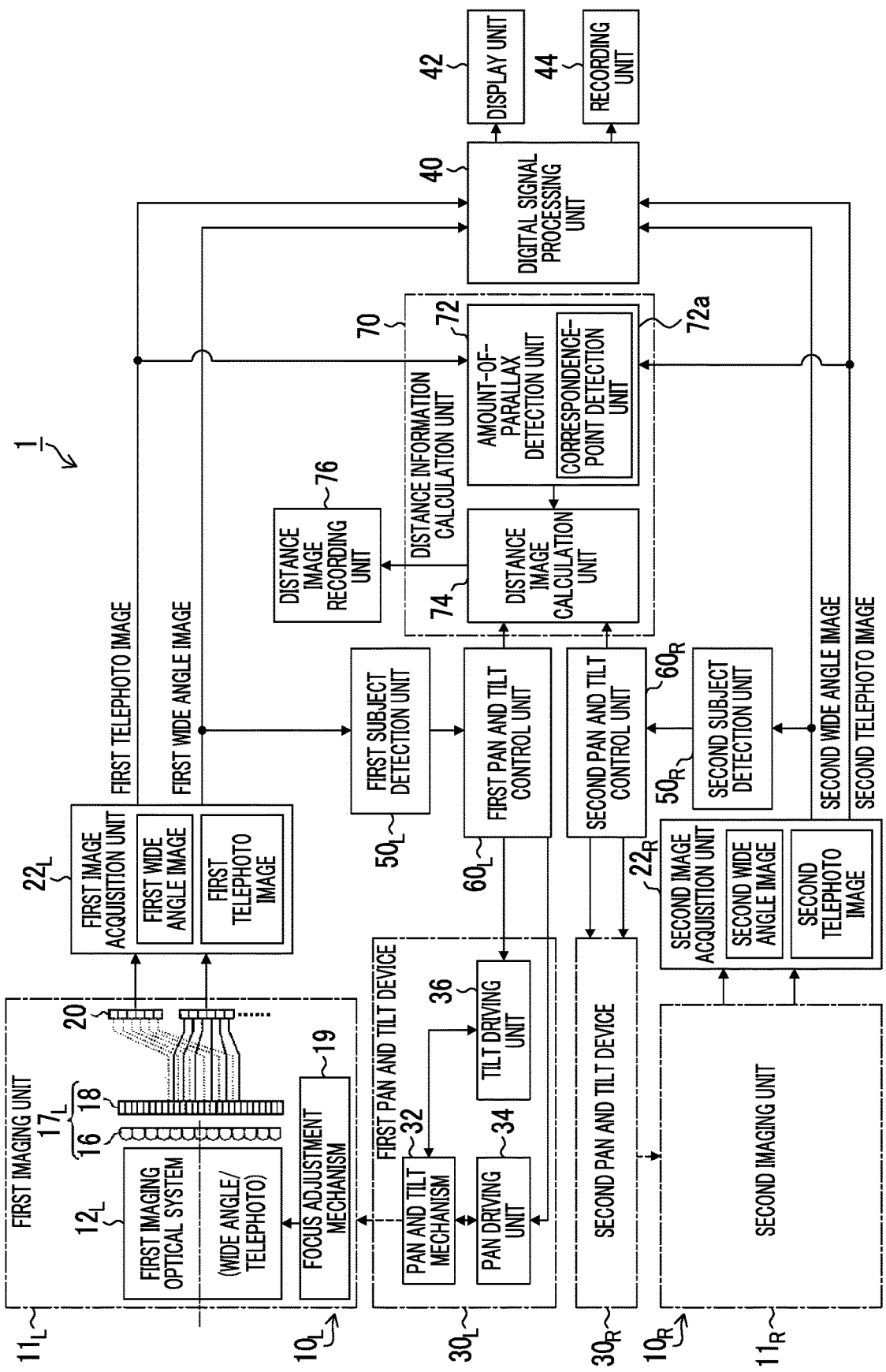
FIG. 4 is a block diagram illustrating an embodiment of an internal configuration of the stereo camera.

The base $4_L$ is rotatably disposed about an axis of the first camera body $2_L$ in a vertical direction Z and is rotated (panned) about an axis in the vertical direction Z by a pan driving unit 34 (FIG. 4).

The holding unit $8_L$ includes a gear 8A provided coaxially with an axis in a horizontal direction X and rotationally moves (tilts) the first imaging unit $11_L$ in a vertical direction according to a driving force transmitted from the tilt driving unit 36 (FIG. 4) via the gear 8A.

The second pan and tilt device $30_R$ includes a base $4_R$, and a holding unit $8_R$ fixed to the base $4_R$ and holding the second imaging unit $11_R$ rotationally movably.

The base $4_R$ is rotatably disposed about an axis of the second camera body $2_R$ in a vertical direction Z and is rotated (panned) about an axis in the vertical direction Z by a pan driving unit 34.

The holding unit $8_R$ includes a gear 8A provided coaxially with an axis in the horizontal direction X and tilts the second imaging unit $11_R$ in a vertical direction according to a driving force transmitted from the tilt driving unit 36 via the gear 8A.

Accordingly, the first pan and tilt camera $10_L$ can cause the imaging direction of the first pan and tilt camera $10_L$ (a direction of the optical axis $L_1$ of the first imaging optical system) to be directed in a desired direction through a pan and tilt operation. Similarly, the second pan and tilt camera $10_R$ can cause the imaging direction of the second pan and tilt camera $10_R$ (a direction of the optical axis $L_2$ of the second imaging optical system) to be directed in a desired direction independently of the first pan and tilt camera $10_L$ through a pan and tilt operation.

[Configuration of First Imaging Unit $11_L$]

Figure 2:
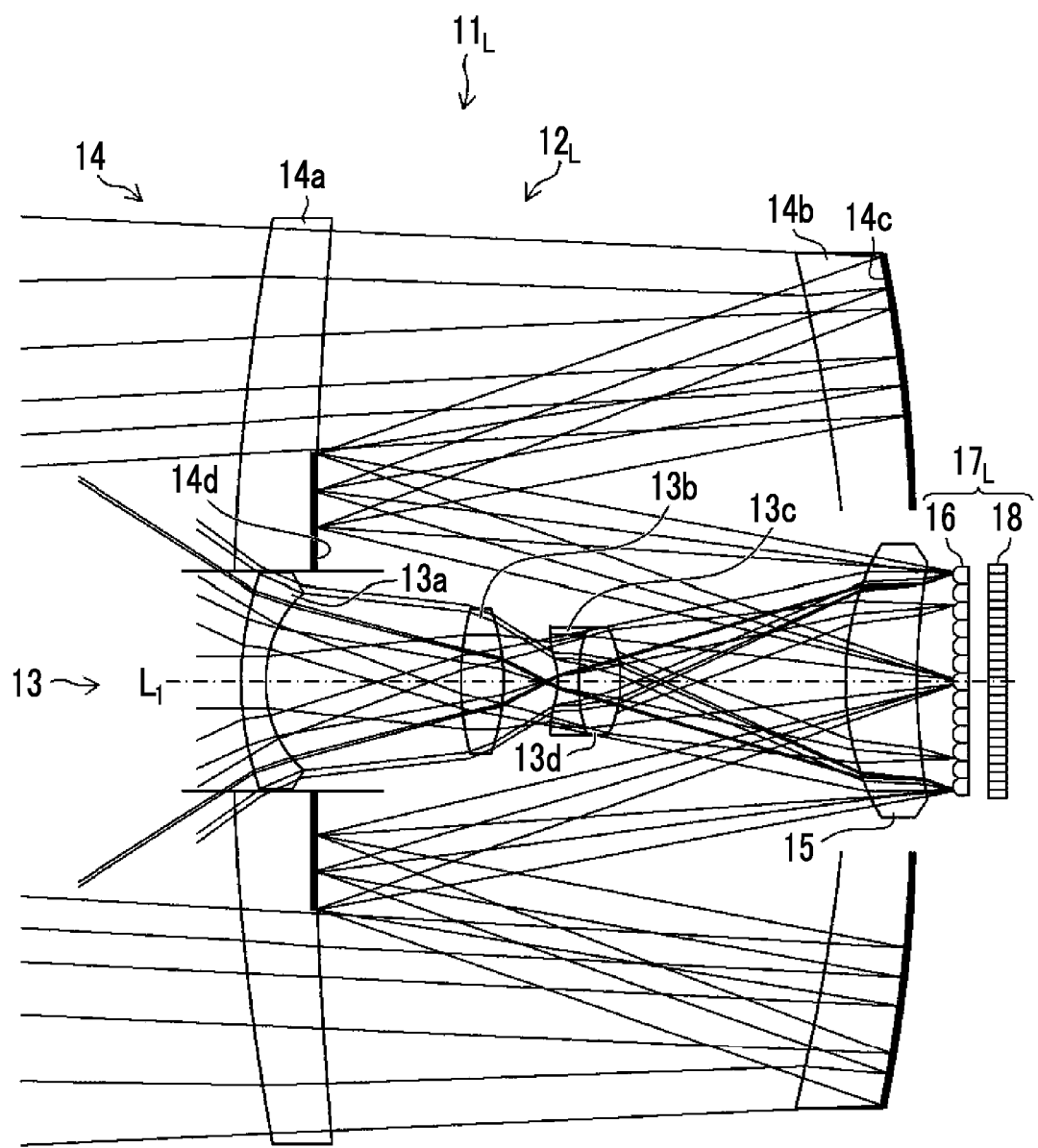
FIG. 2 is a cross-sectional view illustrating a first embodiment of a first imaging unit $11_L$ of a stereo camera.

FIG. 2 is a cross-sectional view illustrating a first embodiment of the first imaging unit $11_L$ of the stereo camera 1.

As illustrated in FIG. 2, the first imaging unit $11_L$ includes a first imaging optical system $12_L$ and a first directivity sensor $17_L$.

<First Imaging Optical System $12_L$>

The first imaging optical system $12_L$ includes a wide angle optical system 13 which is a circular central optical system, and a telephoto optical system 14 which is an annular optical system disposed concentrically with respect to the wide angle optical system 13, which are disposed on the same optical axis.

The wide angle optical system 13 is a wide angle lens including a first lens 13a, a second lens 13b, a third lens 13c, a fourth lens 13d, and a common lens 15, and forms a wide angle image on a microlens array 16 constituting the first directivity sensor $17_L$.

The telephoto optical system 14 is a telephoto lens including a first lens 14a, a second lens 14b, a first reflecting mirror 14c as a reflecting optical system, a second reflecting mirror 14d, and a common lens 15 and forms a telephoto image on the microlens array 16 constituting the first directivity sensor $17_L$.

A light beam incident via the first lens 14a and the second lens 14b is reflected twice by the first reflecting mirror 14c and the second reflecting mirror 14d and then passes through the common lens 15. The light beam is folded back by the first reflecting mirror 14c and the second reflecting mirror 14d, thereby shortening a length in the optical axis direction of the telephoto optical system (telephoto lens) having a long focal length.

<First Directivity Sensor $17_L$>

The first directivity sensor $17_L$ includes a microlens array 16 and an image sensor 18.

Figure 3:
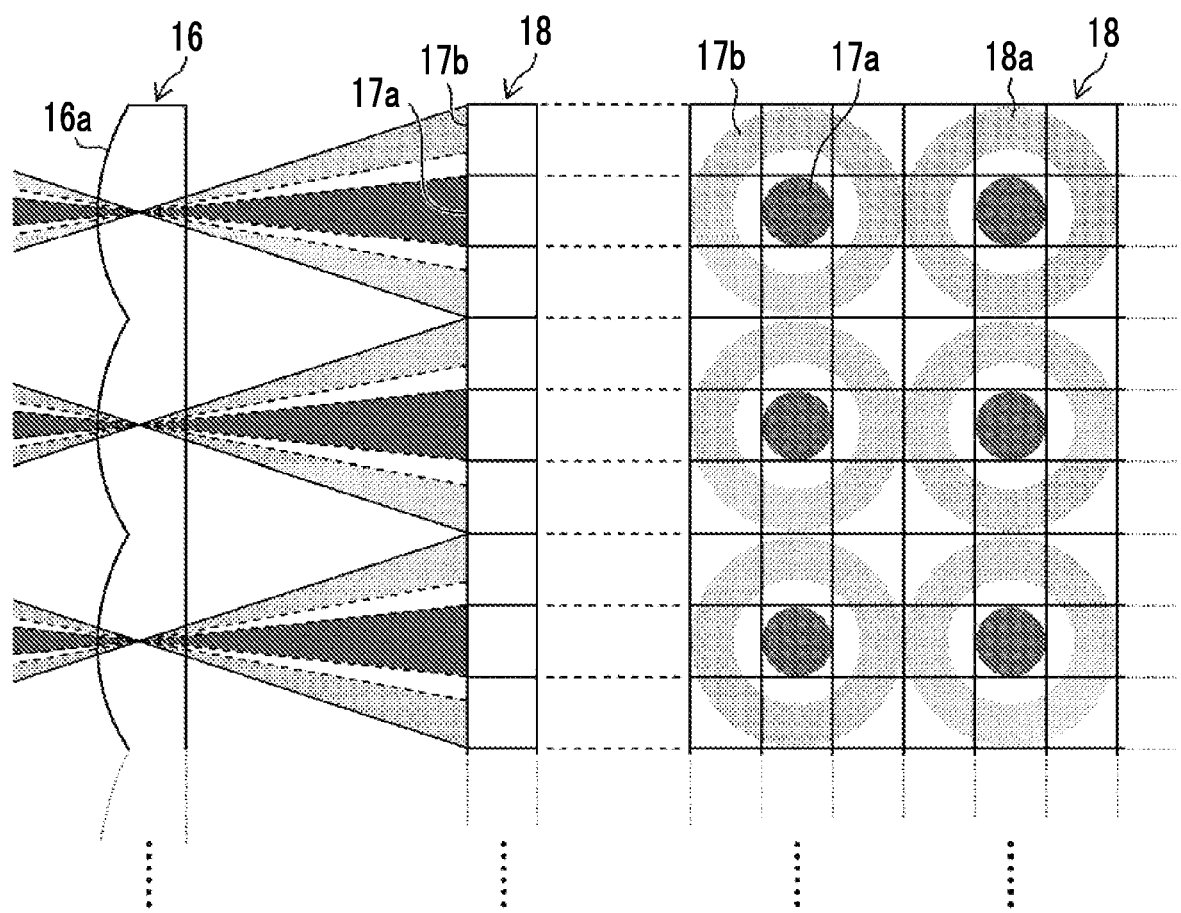
FIG. 3 is an enlarged diagram of main parts of a microlens array and an image sensor illustrated in FIG. 2.

FIG. 3 is an enlarged diagram of main parts of the microlens array 16 and the image sensor 18 illustrated in FIG. 2.

The microlens array 16 includes a plurality of microlenses (pupil image formation lenses) 16a that are two-dimensionally arranged. Horizontal and vertical intervals between the respective microlenses correspond to three light reception cells 18a that are photoelectric conversion elements of the image sensor 18. That is, for each microlens of the microlens array 16, a microlens formed in correspondence to a position of every other light reception cell in each of the horizontal direction and the vertical direction is used.

Each microlens 16a of the microlens array 16 forms a circular central pupil image (a first pupil image) 17a and an annular pupil image (a second pupil image) 17b corresponding to the wide angle optical system 13 and the telephoto optical system 14 of the first imaging optical system $12_L$ on the light reception cell 18a in a corresponding light reception area of the image sensor 18.

According to the microlens array 16 and the image sensor 18 illustrated in FIG. 3, 3×3 light reception cells 18a in the form of a lattice (a square grid) are allocated to one microlens 16a of the microlens array 16. Hereinafter, one microlens 16a and a light reception cell group (the 3×3 light reception cells 18a) corresponding to the one microlens 16a is referred to as a unit block.

The central pupil image 17a is formed only on the light reception cell 18a at a center of the unit block, and the annular pupil image 17b is formed on the eight peripheral light reception cells 18a in the unit block.

According to the first imaging unit $11_L$ having the above configuration, it is possible to capture the first wide angle image corresponding to the wide angle optical system 13 and the first telephoto image corresponding to the telephoto optical system 14 at the same time.

The second imaging unit $11_R$ of the stereo camera 1 is configured similarly to the first imaging unit $11_L$ illustrated in FIGS. 2 and 3, and includes a second imaging optical system including a wide angle optical system and a telephoto optical system, and a second directivity sensor. The second imaging unit $11_R$ can capture the second wide angle image corresponding to the wide angle optical system and the second telephoto image corresponding to the telephoto optical system at the same time.

<Internal Configuration of Stereo Camera 1>

FIG. 4 is a block diagram illustrating an embodiment of an internal configuration of the stereo camera 1. Regarding control of the stereo camera 1, a first image acquisition unit $22_L$, a second image acquisition unit $22_R$, a first subject detection unit $50_L$, a second subject detection unit $50_R$, a first pan and tilt control unit $60_L$, a second pan and tilt control unit $60_R$, a distance image calculation unit 74, an amount-of-parallax detection unit 72, a digital signal processing unit 40, and the like may be configured of a general-purpose CPU or may be configured of a programmable logic device (PLD) that is a processor of which a circuit configuration can be changed after manufacture, such as a field programmable gate array (FPGA), a dedicated electric circuit which is a processor having a circuit configuration provided to be dedicated for execution of a specific process, such as an application specific integrated circuit (ASIC), or a combination thereof. It should be noted that the same applies to a focus control unit 190 and the like in FIG. 8. Further, the stereo camera 1 includes the first pan and tilt camera $10_L$ for a left eye and the second pan and tilt camera $10_R$ for a right eye as described with reference to FIG. 1, and the configurations of both of the cameras are the same. Accordingly, the first pan and tilt camera $10_L$ will be mainly described with reference to FIG. 4, and detailed description of the second pan and tilt camera $10_R$ will be omitted.

As illustrated in FIG. 4, the first pan and tilt camera $10_L$ for a left eye constituting the stereo camera 1 includes the first imaging unit $11_L$ configured of the first imaging optical system $12_L$ including the wide angle optical system 13 and the telephoto optical system 14 described with reference to FIG. 2, and the first directivity sensor $17_L$ including the microlens array 16 and the image sensor 18 described with reference to FIG. 3.

It is preferable for the first imaging unit $11_L$ to include at least a first focus adjustment unit (including a focus adjustment mechanism 19) that automatically performs focus adjustment of the telephoto optical system 14. The focus adjustment mechanism 19 can be configured of, for example, a voice coil motor that moves all or a part of the telephoto optical system 14 in the optical axis direction. In addition, the focus control unit 190 to be described below acquires distance information of a main subject and drives the focus adjustment mechanism 19 on the basis of the acquired distance information, such that the first focus adjustment unit can perform the first focus adjustment of the telephoto optical system 14.

Further, for the wide angle optical system 13, a second focus adjustment unit that automatically performs focus adjustment of the wide angle optical system 13 may be separately provided, or the wide angle optical system 13 may be pan focus. As the second focus adjustment unit applied to the wide angle optical system 13, a focus adjustment unit using a contrast autofocus (AF) scheme or an image plane phase difference AF scheme is conceivable. The contrast AF scheme is a scheme of performing focus adjustment by moving all or some of the wide angle optical system 13 in the optical axis direction so that the contrast of the AF area of the first wide angle image and the second wide angle image is maximized, and the image plane phase difference AF scheme is a scheme of performing focus adjustment of the wide angle optical system 13 by moving all or some of the wide angle optical system 13 in the optical axis direction so that an image plane phase difference of an AF area of the first wide angle image and the second wide angle image becomes 0.

As illustrated in FIG. 1, the first pan and tilt device $30_L$ includes, for example, a pan mechanism that rotates the first imaging unit $11_L$ in the horizontal direction (a pan direction) with respect to the first camera body $2_L$ and a tilt mechanism that rotates the first imaging unit $11_L$ in a vertical direction (a tilt direction) 32 (hereinafter referred to as a "pan and tilt mechanism"), a pan driving unit 34, and a tilt driving unit 36.

The pan and tilt mechanism 32 includes a home position sensor that detects a reference position of a rotation angle (a pan angle) in the pan direction, and a home position sensor that detects a reference position of an inclination angle (a tilt angle) in the tilt direction.

Each of the pan driving unit 34 and the tilt driving unit 36 includes a stepping motor and a motor driver, and output driving force to the pan and tilt mechanism 32 to drive the pan and tilt mechanism 32.

The first imaging unit $11_L$ captures a first wide angle image and a first telephoto image in time series via the first imaging optical system $12_L$ and the first directivity sensor $17_L$, and a subject image formed on a light reception surface of each light reception cell (a photoelectric conversion element) of the first directivity sensor $17_L$ (the image sensor 18) via the first imaging optical system $12_L$ is converted into a signal voltage (or charge) of an amount according to the amount of incident light.

The signal voltage (or charge) accumulated in the image sensor 18 is stored in the light reception cell itself or in an attached capacitor. The stored signal voltage (or charge) is read together with selection of a position of the light reception cell using a metal oxide semiconductor (MOS) type imaging element (so-called complementary metal oxide semiconductor (CMOS) sensor) scheme using an XY address system.

Accordingly, it is possible to read an image signal indicating a first wide angle image of a group of central light reception cells corresponding to the wide angle optical system 13 and an image signal indicating a first telephoto image of a group of eight nearby light reception cells corresponding to the telephoto optical system 14 from the image sensor 18. Further, image signals indicating the first wide angle image and the first telephoto image are successively read at a predetermined frame rate (for example, the number of frames of 24p, 30p, or 60p per second) from the image sensor 18. However, in a case where a shutter button (not shown) is manipulated, the image signals indicating the first wide angle image and the first telephoto image which are each one still image, are read.

For the image signal (a voltage signal) read from the image sensor 18, an image signal for each light reception cell is sampled and held through a sampling two correlation pile process (a process of acquiring accurate pixel data by obtaining a difference between a feedthrough component level and a signal component level included in an output signal for each light reception cell for the purpose of reducing noise (especially, thermal noise) or the like included in a sensor output signal), amplified, and then input to analog/digital (A/D) converter 20. Further, the A/D converter 20 converts sequentially input image signals into digital signals and outputs the digital signals to the image acquisition unit 22. Further, an MOS type sensor may include an A/D converter therein, and in this case, a digital signal is directly output from the image sensor 18.

The first image acquisition unit $22_L$ can acquire the image signal indicating the first wide angle image and the image signal indicating the first telephoto image simultaneously or selectively by selecting the light reception cell position of the image sensor 18 and reading the image signal.

That is, it is possible to acquire an image signal indicating a first wide angle image (an image signal indicating a mosaic image in a Bayer array) of one light reception cell (a central light reception cell among the 3×3 light reception cells) per microlens by selectively reading the image signal of the light reception cell on which the central pupil image 17a of the image sensor 18 is incident, whereas it is possible to acquire an image signal indicating a first telephoto image of eight light reception cells (light reception cells around the 3×3 light reception cells) per microlens by selectively reading the image signal of the light reception cell on which the annular pupil image 17b of the image sensor 18 is incident.

Further, all the image signals may be read from the image sensor 18 and temporarily stored in the buffer memory, and the image signals of the two images including the first wide angle image and the first telephoto image may be grouped from the image signals stored in the buffer memory.

The image signals indicating the first wide angle image and the first telephoto image acquired by the first image acquisition unit $22_L$ are output to the digital signal processing unit 40 and the first subject detection unit $50_L$, respectively.

The first subject detection unit $50_L$ detects the main subject on the basis of the image signal indicating the first wide angle image acquired by the first image acquisition unit $22_L$ and outputs the position information in the image of the detected main subject to the first pan and tilt control unit $60_L$.

An example of a method of detecting the main subject in the first subject detection unit $50_L$ includes a method of detecting a specific object (a main subject) using an object recognition technique represented by a technique of performing face recognition of a person, or a moving body detection method of detecting a moving body as a main subject.

An example of a method of detecting an object through object recognition includes a method of registering a feature of an appearance of a specific object as an object dictionary in advance, and recognizing an object while comparing an image cut out while changing a position or a size from a captured image with the object dictionary.

Figure 5:
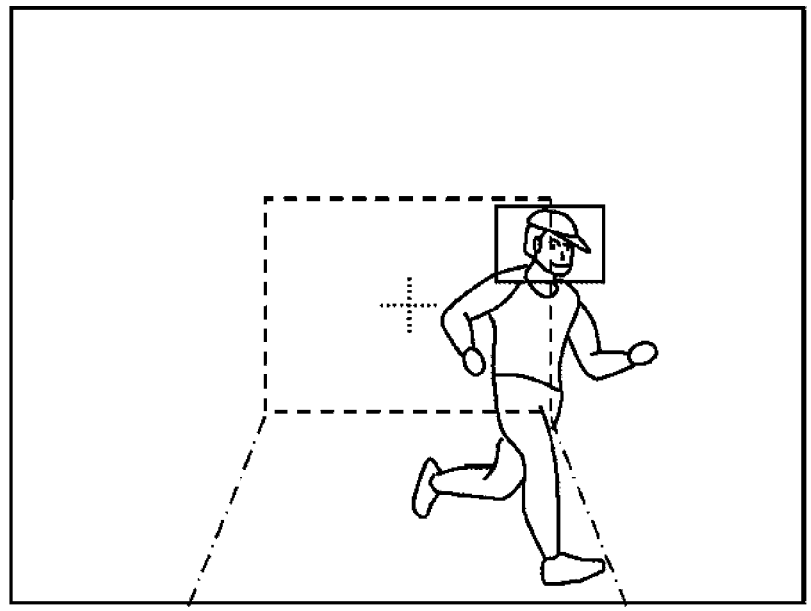
FIG. 5 is a diagram illustrating an example of a wide angle image and a telephoto image captured by a stereo camera.
Figure 5:
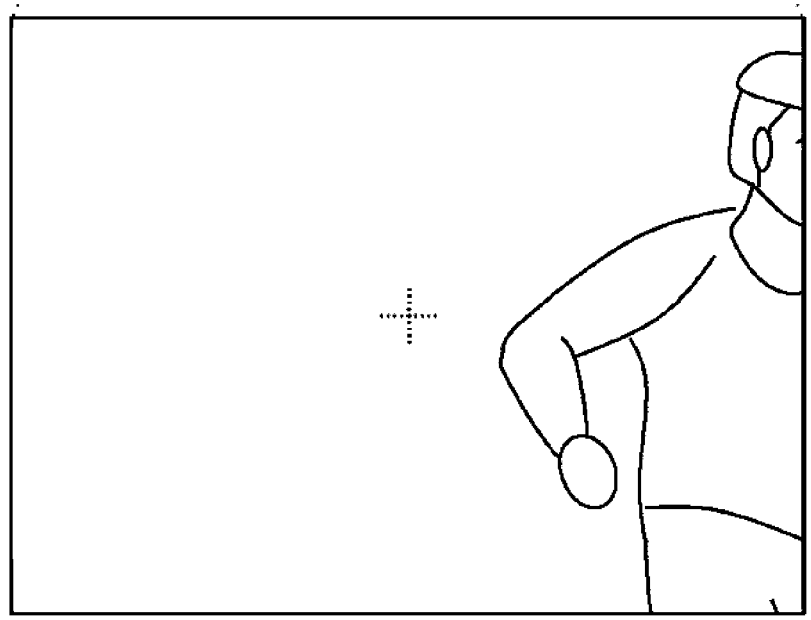

FIG. 5 is a diagram illustrating an example of the first wide angle image and the first telephoto image that are captured. Further, an area indicated by a broken line in the first wide angle image indicates an imaging range of the first telephoto image.

Figure 6:
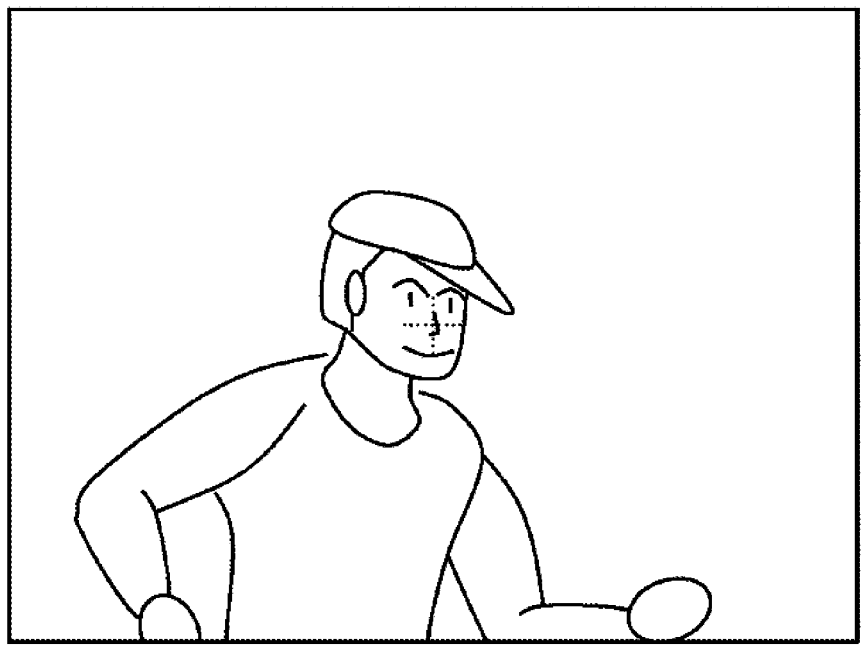
FIG. 6 is an image diagram illustrating a first telephoto image showing a state in which pan and tilt control is performed so that a specific main subject (a face of a person) is located at a center of the first telephoto image.

In a case where the first wide angle image and the first telephoto image illustrated in FIG. 6 are captured, a "face" of a person is set as the main subject, and the "face" of the person is detected using the face recognition technology, the first subject detection unit $50_L$ can detect the "face" in the first wide angle image. In a case where the first subject detection unit $50_L$ detects the "face" of the person from the first telephoto image, the first subject detection unit $50_L$ cannot detect the "face" from the first telephoto image since only a part of the face of the person is included in the first telephoto image illustrated in FIG. 5. In particular, in a case where an imaging magnification of the telephoto optical system 14 is a high magnification (in a case where an angle of view is very small), a probability of a desired main subject being not included in the first telephoto image is high.

Position information in the first wide angle image of the main subject (in this example, the "face" of the person) detected by the first subject detection unit $50_L$ is output to the first pan and tilt control unit $60_L$.

The first pan and tilt control unit $60_L$ is a unit that controls the first pan and tilt device $30_L$ on the basis of the position information of the main subject in the first wide angle image input from the first subject detection unit $50_L$. The first pan and tilt control unit $60_L$ controls the pan and tilt mechanism 32 (that is, an imaging direction of the first imaging unit $11_L$) via the pan driving unit 34 and the tilt driving unit 36 so that the position information in the first wide angle image of the main subject (for example, a position of a centroid of a face area in a case where the main subject is a "face" of a person) is moved to a center position (a position on the optical axis $L_1$) of the first wide angle image.

In a case where the pan and tilt mechanism 32 is controlled so that the main subject is captured on the optical axis $L_1$ of the first imaging optical system $12_L$ (so that the main subject is included at the center position of the first wide angle image), the main subject is included at the center position of the first telephoto image. This is because the optical axes $L_1$ of the wide angle optical system 13 and the telephoto optical system 14 constituting the first imaging optical system $12_L$ match each other (see FIG. 2).

FIG. 6 is an image diagram illustrating a first telephoto image showing a state in which pan and tilt control is performed so that a specific main subject (in this example, a "face" of a person) is at a center of the first wide angle image.

On the other hand, the second pan and tilt camera $10_R$ for a right eye constituting the stereo camera 1 includes the second imaging unit $11_R$ including the second imaging optical system $12_R$ and a second directivity sensor $17_R$ (not illustrated), and the second pan and tilt device $30_R$, similar to the first pan and tilt camera $10_L$ for a left eye.

The second imaging unit $11_R$ captures the second wide angle image and the second telephoto image in time series via the second imaging optical system $12_R$ and the second directivity sensor $17_R$. An image signal indicating the second wide angle image and an image signal indicating the second telephoto image can be output from the second directivity sensor $17_R$ at the same time.

The second image acquisition unit $22_R$ acquires the image signal indicating the second wide angle image and the image signal indicating the second telephoto image simultaneously or selectively from the second imaging unit $11_R$.

The image signals indicating the second wide angle image and the second telephoto image acquired by the second image acquisition unit $22_R$ are output to the digital signal processing unit 40 and the second subject detection unit $50_R$, respectively.

The second subject detection unit $50_R$ detects the main subject on the basis of the image signal indicating the second wide angle image acquired by the second image acquisition unit $22_R$ and outputs the position information in the image of the detected main subject to the second pan and tilt control unit $60_R$.

The second pan and tilt control unit $60_R$ is a unit that controls the second pan and tilt device $30_R$ on the basis of the position information of the main subject in the second wide angle image input from the second subject detection unit $50_R$. The second pan and tilt control unit $60_R$ controls the pan and tilt mechanism 32 (that is, an imaging direction of the second imaging unit $11_R$) via the pan driving unit 34 and the tilt driving unit 36 so that the position information in the second wide angle image of the main subject is moved to a center position (a position on the optical axis $L_2$) of the second wide angle image.

In a case where the pan and tilt mechanism 32 is controlled so that the main subject is captured on the optical axis $L_2$ of the second imaging optical system $12_R$ (so that the main subject is included at the center position of the second wide angle image), the main subject is included at the center position of the second telephoto image. This is because the optical axes $L_2$ of the wide angle optical system 13 and the telephoto optical system 14 constituting the second imaging optical system $12_R$ match each other (see FIG. 2).

A digital image signal indicating the first wide angle image and the first telephoto image from the first image acquisition unit $22_L$ and a digital image signal indicating the second wide angle image and the second telephoto image from the second image acquisition unit $22_R$ are input to the digital signal processing unit 40. The digital signal processing unit 40 performs predetermined signal processing such as offset processing or gamma-correction processing on each input image signal.

In a case where a display unit 42 includes a stereoscopically displaying function, the digital signal processing unit 40 generates data for a display of a stereoscopic wide angle image from an image signal indicating the first wide angle image and the second wide angle image, which is a stereo image or generates data for a display of a stereoscopic telephoto image from an image signal indicating the first telephoto image and the second telephoto image, which is a stereo image, and outputs the generated data for a display to the display unit 42, so that a stereoscopic wide angle image or a three-dimensional telephoto image is displayed on the display unit 42.

Further, in a case where the display unit 42 has no stereoscopically displaying function, the digital signal processing unit 40 generates, for example, display data of the wide angle image or the telephoto image from the image signal indicating the first wide angle image or the first telephoto image and outputs the generated display data to the display unit 42 so that the wide angle image or the telephoto image is displayed on the display unit 42.

Further, in a case where the main subject is captured on the optical axes $L_1$ and $L_2$ of the first imaging optical system $12_L$ and the second imaging optical system $12_R$, the digital signal processing unit 40 generates recording data from the image signal indicating the first wide angle image and the second wide angle image which is a stereo image or generates recording data from the image signal indicating the first telephoto image and the second telephoto image which is a stereo image and outputs the generated recording data to a recording unit 44, so that the recording data is recorded on a recording medium (hard disk, memory card, or the like). Further, the recording unit 44 may record only the first telephoto image and the second telephoto image. The display unit 42 can also reproduce a necessary image on the basis of the recording data recorded on the recording unit 44.

<Distance Information Calculation Unit 70>

Next, a distance information calculation unit 70 will be described.

The distance information calculation unit 70 includes the amount-of-parallax detection unit 72 and a distance image calculation unit 74.

The image signal indicating the first telephoto image acquired by the first image acquisition unit $22_L$ and the image signal indicating the second telephoto image acquired by the second image acquisition unit $22_R$ are input to the amount-of-parallax detection unit 72. The amount-of-parallax detection unit 72 receives an image signal indicating the first telephoto image and the second telephoto image in a case where the main subject is captured on the optical axes $L_1$ and $L_2$ of the first imaging optical system $12_L$ and the second imaging optical system $12_R$ (in a case where optical axes $L_1$ and $L_2$ intersect and the main subject is located at a cross point at which $L_1$ and $L_2$ intersect).

The amount-of-parallax detection unit 72 includes a correspondence-point detection unit 72a that detects correspondence points of which the feature quantities match each other between the first telephoto image and the second telephoto image on the basis of the input image signals indicating the first telephoto image and the second telephoto image, and detects amounts of parallax in the first directivity sensor $17_L$ and the second directivity sensor $17_R$ at the two correspondence points detected by the correspondence-point detection unit 72a.

The detection of the correspondence points performed by the correspondence-point detection unit 72a is performed by detecting the pixel position on the second telephoto image corresponding to a target pixel having the highest correlation through block matching between an image having a predetermined block size with reference to a target pixel of the first telephoto image and the second telephoto image.

Information indicating the amount of parallax in the first directivity sensor $17_L$ and the second directivity sensor $17_R$ at two correspondence points of the first telephoto image and the second telephoto image, which are detected by the amount-of-parallax detection unit 72, is output to the distance image calculation unit 74.

Angle information indicating the pan angle and the tilt angle of the first pan and tilt device $30_L$ including the first pan and tilt mechanism and the second pan and tilt device $30_R$ including the second pan and tilt mechanism (the information indicating the directions of the optical axes $L_1$ and $L_2$ of the first imaging optical system $12_L$ and the second imaging optical system $12_R$) is input from the first pan and tilt control unit $60_L$ and the second pan and tilt control unit $60_R$ to the other inputs of the distance image calculation unit 74. The distance image calculation unit 74 calculates three-dimensional space information including the distance information of the correspondence point on the basis of the input information.

Next, a method of calculating the distance information of the main subject or the like will be described with reference to FIG. 7.

Figure 7:
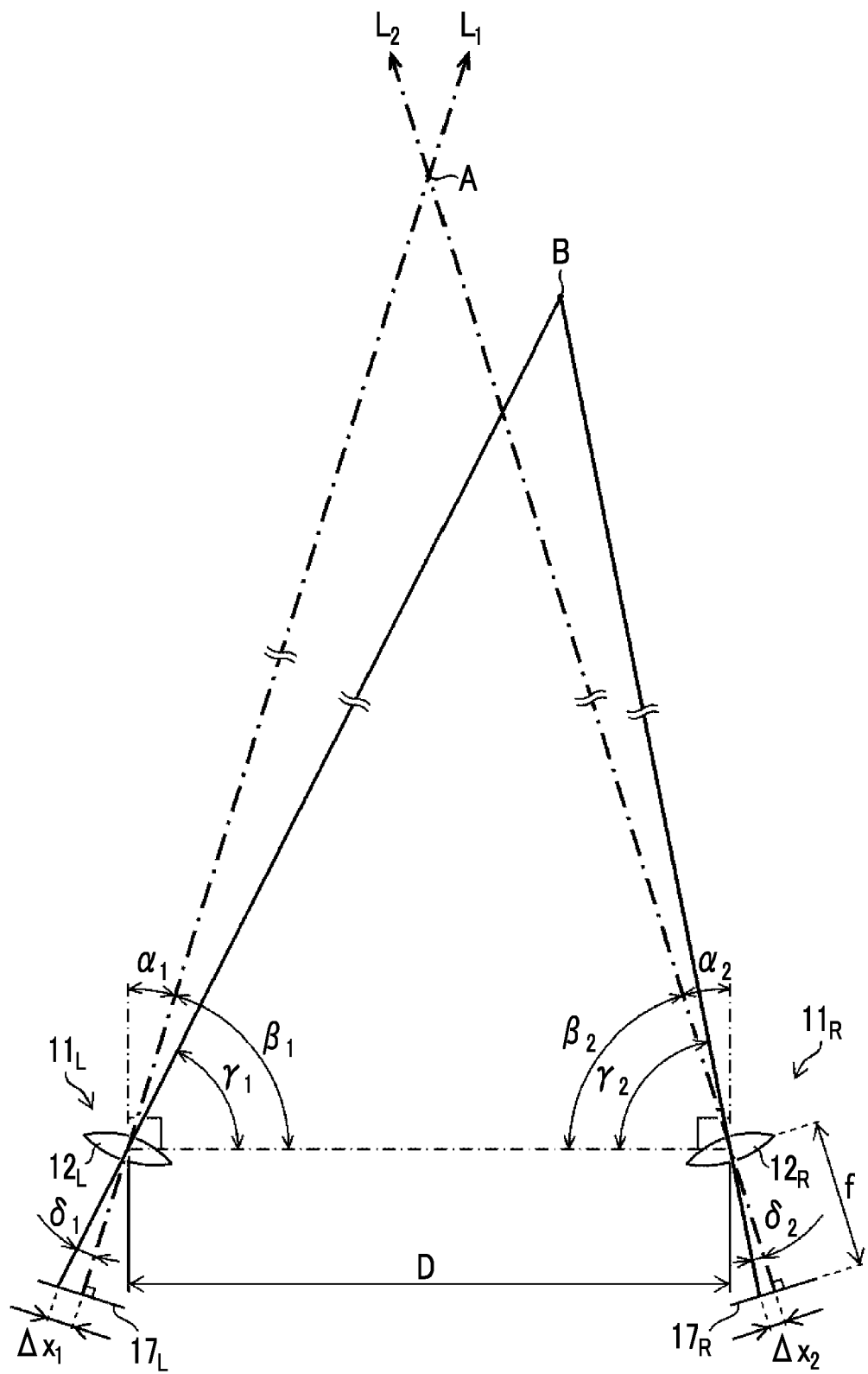

FIG. 7 illustrates a case where the pan angle and the tilt angle of the first imaging unit $11_L$ (the first imaging optical system $12_L$) and the second imaging unit $11_R$ (the second imaging optical system $12_R$) are controlled, and the main subject is located at a cross point A at which the optical axes $L_1$ and $L_2$ of the first imaging optical system $12_L$ and the second imaging optical system $12_R$ cross each other. Further, in order to simplify the description, the optical axes $L_1$ and $L_2$ of the first imaging optical system $12_L$ and the second imaging optical system $12_R$ are assumed to be horizontal.

A meaning of each symbol illustrated in FIG. 7 is as follows.

A: Cross point at which the optical axes $L_1$ and $L_2$ intersect (a position of the main subject)

B: Any correspondence point in the first telephoto image and the second telephoto image $\alpha_1$: Pan angle of the first imaging optical system $12_L$ $\alpha_2$: Pan angle of the second imaging optical system $12_R$ D: Baseline length $\Delta x_1$: Amount of parallax in the first directivity sensor $17_L$ at the correspondence point B $\Delta x_2$: Amount of parallax in the second directivity sensor $17_R$ at the correspondence point B $\delta_1$: Angle in the horizontal direction of the correspondence point B with respect to the optical axis L1

$\delta_2$: Angle in the horizontal direction of the correspondence point B with respect to the optical axis L2 f: Focal length of the telephoto optical system 14 included in the first imaging optical system $12_L$ and the second imaging optical system $12_R$ In FIG. 7, considering a triangle consisting of respective positions of the first imaging optical system $12_L$ and the second imaging optical system $12_R$ and the cross point A (the main subject), a length of a base side of the triangle is equal to the baseline length D and is known.

In a case where base angles of the triangle are $\beta_1$ and $\beta_2$, the base angles $\beta_1$ and $\beta_2$ can be calculated on the basis of the pan angle $\alpha 1$ and the pan angle $\alpha_2$, respectively.

Accordingly, distance information of the cross point A (the main subject) of a vertex of the triangle, which is a measurement point, can be calculated from the known base side (the baseline length D) and the two base angles $\beta_1$ and $\beta_2$.

On the other hand, the angle $\delta_1$ in the horizontal direction of the correspondence point B with respect to the optical axis $L_1$ and the angle $\delta_2$ in the horizontal direction of the correspondence point B with respect to the optical axis L2 can be calculated by the following equation on the basis of the amounts of parallax $\Delta x_1$ and $\Delta x_2$ in the first directivity sensor $17_L$ and the second directivity sensor $17_R$ and the focal length f of the telephoto optical system 14.

$$\delta_1 = \arctan(\Delta x_1/f)$$

$$\delta_2 = \arctan(\Delta x_2/f) \quad \text{[Equation 1]}$$

The amounts of parallax $\Delta x_1$ and $\Delta x_2$ of the first directivity sensor $17_L$ and the second directivity sensor $17_R$ of the correspondence point B are calculated using the following equation, in which the pixel positions of the pixels at which the correspondence point B is formed as an image from the center positions of the first directivity sensor $17_L$ and the second directivity sensor $17_R$ (positions corresponding to the optical axes $L_1$ and $L_2$) are n1 and n2 and a pixel pitch of the first directivity sensor $17_L$ and the second directivity sensor $17_R$ is p.

$$\Delta x_1 = n1 \times p$$

$$\Delta x_2 = n2 \times p \quad \text{[Equation 2]}$$

Since the pixel pitch p of the first directivity sensor $17_L$ and the second directivity sensor $17_R$ is known, the amounts of parallax $\Delta x_1$ and $\Delta x_2$ can be calculated using Equation[2] by detecting the position of the correspondence point B on the first directivity sensor $17_L$ and the second directivity sensor $17_R$.

In FIG. 7, considering the triangle consisting of the respective positions of the first imaging optical system $12_L$ and the second imaging optical system $12_R$ and any correspondence point B, the distance information of the correspondence point B, which is the vertex of the triangle, can be calculated on the basis of the length (the baseline length D) of the base side of the triangle and the two base angles $\gamma 1$ and $\gamma 2$.

Further, the two base angles $\gamma 1$ and $\gamma 2$ can be obtained using pan angles $\alpha_1$ and $\alpha_2$, and angles $\delta_1$ and $\delta_2$ calculated using Equation 1.

Referring back to FIG. 4, the distance image calculation unit 74 can calculate the distance image by calculating the distance information for each correspondence point of the first telephoto image and the second telephoto image.

Here, the distance image is a two-dimensional distribution image of a distance value (distance information) up to the subject obtained by the stereo camera 1, and each pixel of the distance image has distance information. Further, the distance information of the cross point A (the main subject) is distance information of a significant point at which the amounts of parallax $\Delta x_1$ and $\Delta x_2$ are 0.

The distance image calculated by the distance image calculation unit 74 is recorded on a distance image recording unit 76. Through the calculation of the distance image by the distance image calculation unit 74, it is possible to acquire three-dimensional information of a structure, for example, in a case where the structure is the subject, and to appropriately utilize the acquired three-dimensional information by recording the three-dimensional information on the distance image recording unit 76.

<First Focus Adjustment Unit>

Next, the first focus adjustment unit that automatically performs the focus adjustment of the telephoto optical system 14 included in the first imaging optical system $12_L$ and the second imaging optical system $12_R$.

Figure 8:
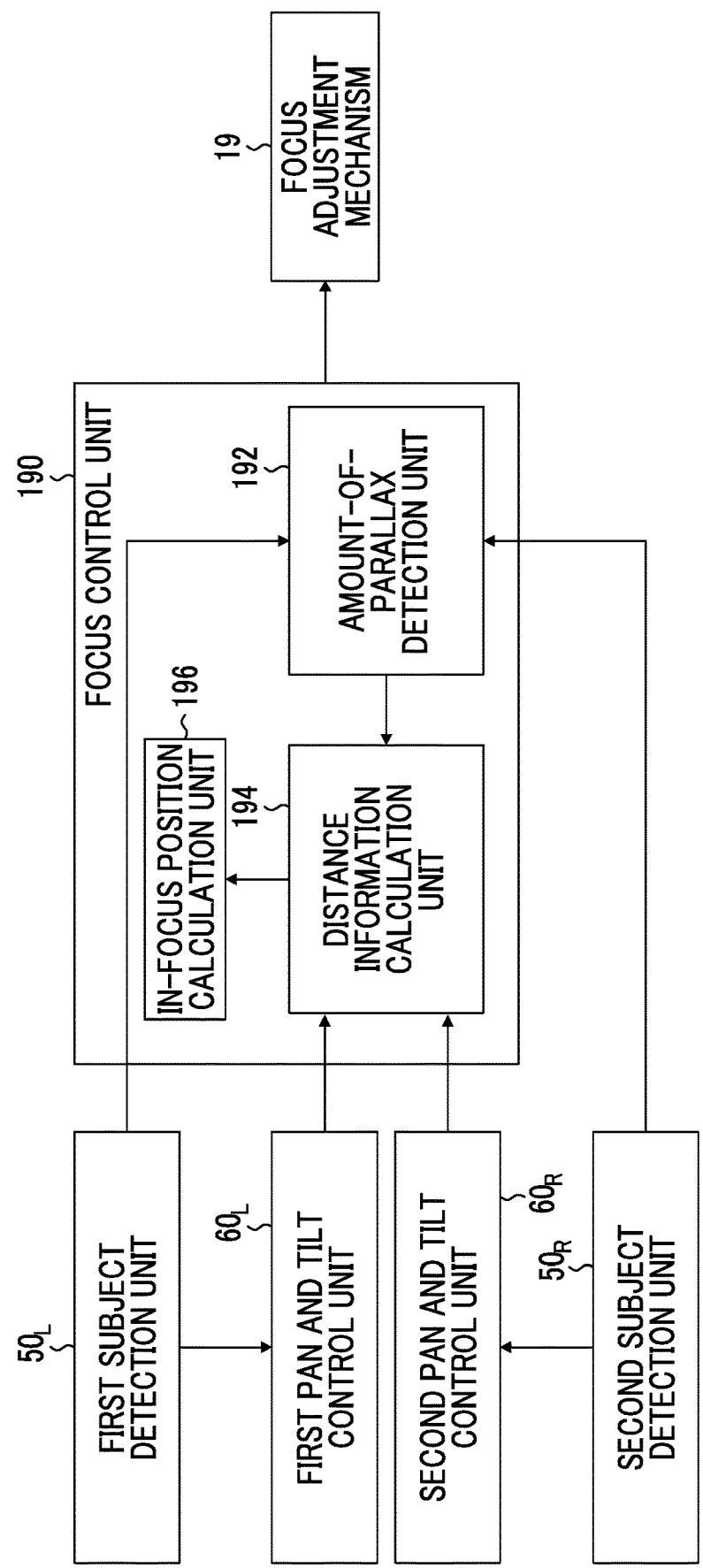
FIG. 8 is a block diagram illustrating a first focus adjustment unit.

FIG. 8 is a block diagram illustrating the first focus adjustment unit.

The first focus adjustment unit illustrated in FIG. 8 is provided in each of the first imaging unit $11_L$ and the second imaging unit $11_R$. The first focus adjustment unit includes a focus adjustment mechanism 19 that moves all or a part of the telephoto optical system 14 in the optical axis direction, and a focus control unit 190 that controls the focus adjustment mechanism 19.

The focus control unit 190 includes, for example, an amount-of-parallax detection unit 192, a distance information calculation unit 194, and a in-focus position calculation unit 196.

Position information of the main subject in the first wide angle image and the second wide angle image is input from the first subject detection unit $50_L$ and the second subject detection unit $50_R$ to the amount-of-parallax detection unit 192. The amount-of-parallax detection unit 192 detects the amount of parallax of the main subject in the first directivity sensor $17_L$ and the second directivity sensor $17_R$ on the basis of the input position information of the main subject.

Further, the position information of the main subject in the first wide angle image and the second wide angle image detected by the first subject detection unit $50_L$ and the second subject detection unit $50_R$ is used for control of the first pan and tilt device $30_L$ and the second pan and tilt device $30_R$ in the first pan and tilt control unit $60_L$ and the second pan and tilt control unit $60_R$ as described above, but is used for detection of the amount of parallax in the focus control unit 190. In addition, even before the main subject is captured on the optical axes $L_1$ and $L_2$ of the first imaging optical system $12_L$ and the second imaging optical system $12_R$, the focus control unit 190 in the present example can perform the focus adjustment of the telephoto optical system 14. However, when the focus adjustment of the telephoto optical system 14 is performed in a state in which the main subject is captured on the optical axes $L_1$ and $L_2$ of the first imaging optical system $12_L$ and the second imaging optical system $12_R$, the amount-of-parallax detection unit 192 becomes unnecessary. This is because the amount of parallax is zero in a case where the main subject is captured on the optical axes $L_1$ and $L_2$ of the first imaging optical system $12_L$ and the second imaging optical system $12_R$.

The amount of parallax detected by the amount-of-parallax detection unit 192 is output to the distance information calculation unit 194. Angle information indicating the pan angle and the tilt angle of the first pan and tilt device $30_L$ (information indicating the directions of the respective optical axes $L_1$ and $L_2$ of the first imaging optical system $12_L$ and the second imaging optical system $12_R$) is input from the first pan and tilt control unit $60_L$ to the other input of the distance information calculation unit 194. The distance information calculation unit 194 calculates the distance information of the main subject on the basis of these input information. Further, the calculation of the distance information of the main subject performed by the distance information calculation unit 194 is performed similarly to the calculation of the distance information of the correspondence point performed by the distance information calculation unit 70 illustrated in FIG. 4, but both differ in that the amounts of parallax $\Delta x_1$ and $\Delta x_2$ shown in Equation 1 described above are the amounts of parallax of the main subject in the first wide angle image and the second wide angle image in the first directivity sensor $17_L$ and the second directivity sensor $17_R$ and the focal length f is a focal length of the wide angle optical system 13 included in the first imaging optical system $12_L$ and the second imaging optical system $12_R$.

The distance information of the main subject calculated by the distance information calculation unit 194 is output to the in-focus position calculation unit 196. On the basis of the distance information of the main subject input from the distance information calculation unit 194, the in-focus position calculation unit 196 calculates a movement position in the optical axis direction of all or a part of the telephoto optical system 14 of the first imaging optical system $12_L$ and the second imaging optical system $12_R$, which is an in-focus position focused on the main subject. Further, since the movement position in the optical axis direction of all or a part of the telephoto optical system 14 and the distance information of the subject focused according to the movement position are in one-one correspondence with each other, the in-focus position calculation unit 196 can calculate the in-focus position focused on the main subject in a case where the distance information of the main subject can be acquired.

The focus control unit 190 controls the focus adjustment mechanism 19 on the basis of the in-focus position calculated by the in-focus position calculation unit 196 so that all or a part of the telephoto optical system 14 of the first imaging optical system $12_L$ and the second imaging optical system $12_R$ is moved to the in-focus position in the optical axis direction, thereby performing focus adjustment (first focus adjustment) of the telephoto optical system 14.

It should be noted that the focus control unit 190 in the example acquires the distance information of the main subject on the basis of, for example, the amount of parallax of the main subject in the first directivity sensor $17_L$ and the second directivity sensor $17_R$ of the main subject included in the first wide angle image and the second wide angle image, and performs focus adjustment of the respective telephoto optical systems 14 of the first imaging optical system $12_L$ and the second imaging optical system $12_R$ on the basis of the acquired distance information, but the present invention is not limited thereto, and in a case where a focus adjustment unit (second focus adjustment unit), such as a contrast AF or an image plane phase difference AF, that performs focus adjustment of the wide angle optical system 13 of the first imaging optical system $12_L$ and the second imaging optical system $12_R$ is provided, the distance information of the main subject may be acquired on the basis of the in-focus information of the wide angle optical system 13 from the second focus adjustment unit (for example, a movement position in the optical axis direction of all or some of the wide angle optical system 13 in the in-focus state), and the focus adjustment of the respective telephoto optical system 14 of the first imaging optical system $12_L$ and the second imaging optical system $12_R$ may be performed on the basis of the acquired distance information.

Figure 9:
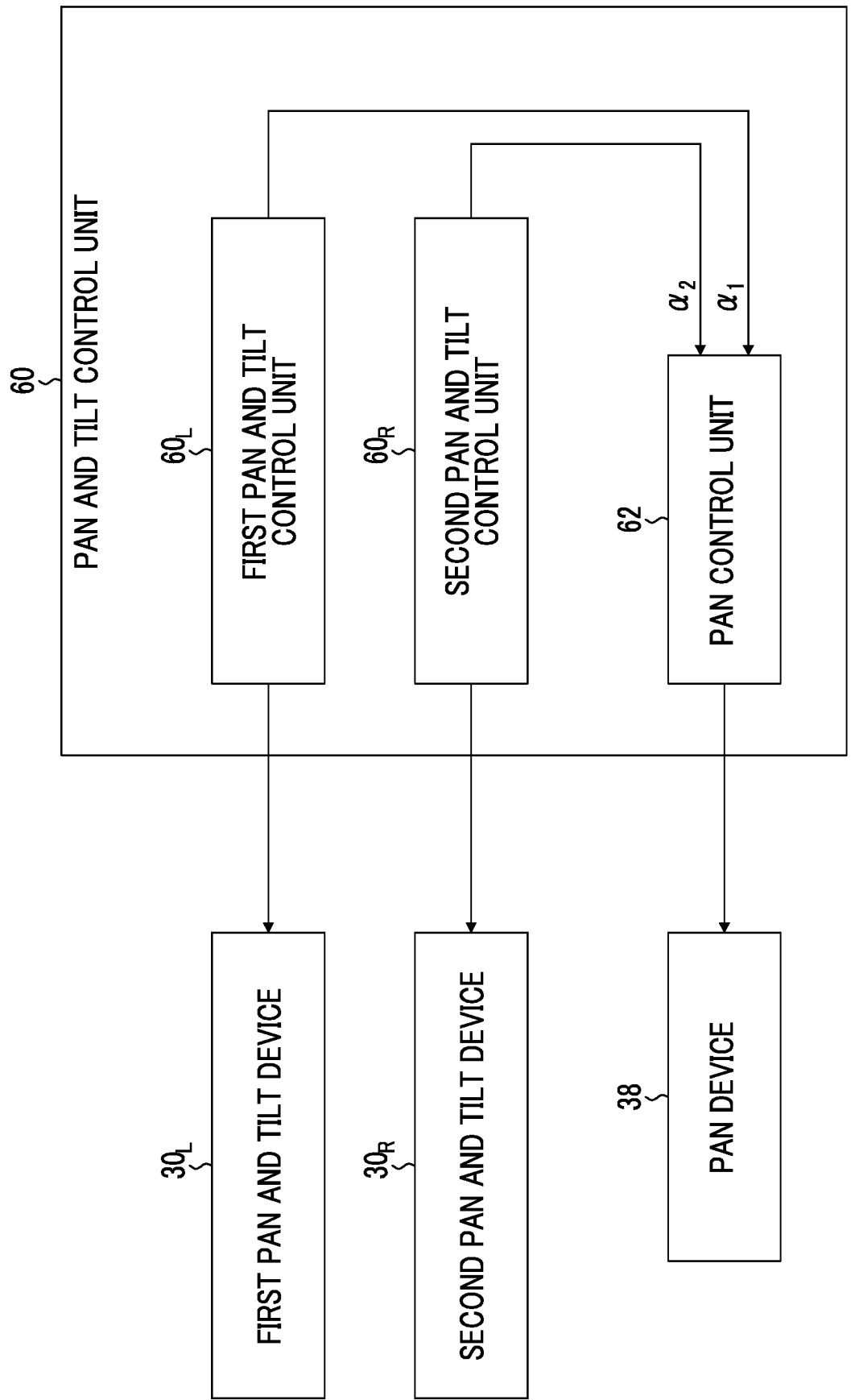
FIG. 9 is a block diagram of a pan and tilt control unit 60.

FIG. 9 is a block diagram of the pan and tilt control unit 60. The pan and tilt control unit 60 includes a pan control unit 62 that controls the pan device 38 illustrated in FIG. 1, in addition to the first pan and tilt control unit $60_L$ and the second pan and tilt control unit $60_R$ illustrated in FIG. 4.

The pan control unit 62 controls the pan device 38 including the pan mechanism on the basis of the first wide angle image and the second wide angle image so that the first imaging unit $11_L$ and the second imaging unit $11_R$ directly face the main subject.

The first pan and tilt control unit $60_L$ and the second pan and tilt control unit $60_R$ control the first pan and tilt device $30_L$ and the second pan and tilt device $30_R$ on the basis of the position information of the main subject in the first wide angle image and the second wide angle image, of the main subject detected by the first subject detection unit $50_L$ and the second subject detection unit $50_R$, but the pan control unit 62 acquires angle information indicating the pan angle $\alpha_1$ and pan angle $\alpha_2$ (see FIG. 7) of the first pan and tilt device $30_L$ and the second pan and tilt device $30_R$ from the first pan and tilt control unit $60_L$ and the second pan and tilt control unit $60_R$.

In FIG. 7, in a case where pan angle $\alpha_1$ and pan angle $\alpha_2$ are positive in a clockwise direction, the pan control unit 62 rotationally moves the pan device 38 (the holding member 37 that holds the first pan and tilt device $30_L$ and the second pan and tilt device $30_R$) in a horizontal direction so that the pan angle $\alpha_1$ is positive, the pan angle $\alpha_2$ is negative, and an absolute value of the pan angle α1 becomes equal to an absolute value of the pan angle $\alpha_2$, on the basis of the angle information indicating the pan angle $\alpha_1$ and the pan angle $α_2$. That is, in a case where the pan device 38 is rotationally moved by the pan control unit 62, the first pan and tilt device 30$_L$ and the second pan and tilt device 30$_R$ are driven and controlled in the pan direction to capture the main subject on the optical axes $L_1$ and $L_2$. Therefore, by controlling a rotationally moving position of the pan device 38, the pan angle $α1$ can be positive, the pan angle $α_2$ can be negative, and the absolute values of the pan angle $α1$ and the pan angle $α_2$ can be equal.

By rotationally moving the holding member 37 (the entire stereo camera 1) that holds the first pan and tilt device 30$_L$ and the second pan and tilt device 30$_R$, in the horizontal direction as described above, a distance between the first imaging unit 11$_L$ and the second imaging unit 11$_R$ with respect to the main subject can be equidistant and the distance information of the main subject or the like can be calculated more accurately.

[Method of Controlling Stereo Camera]

Next, a method of controlling the stereo camera according to the present invention will be described.

Figure 10:
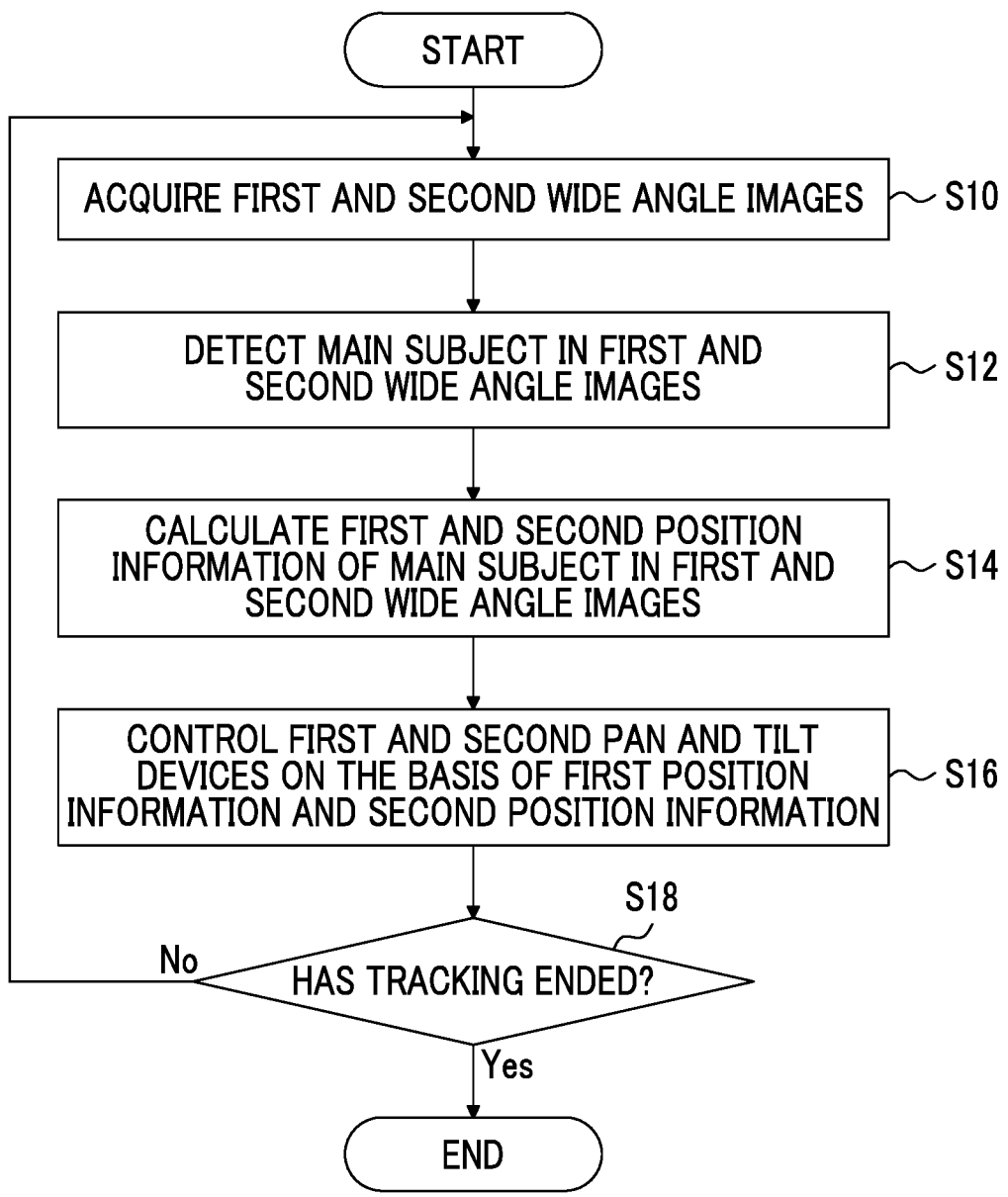
FIG. 10 is a flowchart showing pan and tilt control for causing a main subject to be captured on optical axes $L_1$ and $L_2$ of a first imaging optical system $12_L$ and a second imaging optical system $12_R$.

FIG. 10 is a flowchart showing pan and tilt control for capturing the main subject on the respective optical axes $L_1$ and $L_2$ of the first imaging optical system 12$_L$ and the second imaging optical system 12$_R$.

As illustrated in FIG. 10, the first wide angle image is acquired via the first imaging unit 11$_L$ and the first image acquisition unit 22$_L$, and the second wide angle image is acquired via the second imaging unit 11$_R$ and the second image acquisition unit 22$_R$ (step S10).

Subsequently, the first subject detection unit 50$_L$ and the second subject detection unit 50$_R$ detect the main subject in the first wide angle image and the second wide angle image that have been acquired (step S12), and calculates position information of the detected main subject (first and second position information) in the first wide angle image and the second wide angle image (step S14).

The first pan and tilt device 30$_L$ and the second pan and tilt device 30$_R$ are controlled on the basis of the first position information and the second position information of the first wide angle image and the second wide angle image of the main subject calculated in step S14 (step S16).

Then, a determination is made as to whether or not tracking of the main subject has ended (step S18). That is, in a case where the main subject moves and the first wide angle image and the second wide angle image that are stereo images and the first telephoto image and the second telephoto image that are stereo images are acquired as moving images, it is necessary to always capture the main subject (track the main subject) on the optical axes $L_1$ and $L_2$ of the first imaging optical system 12$_L$ and the second imaging optical system 12$_R$.

Therefore, a determination is made as to whether or not the automatic tracking of the main subject has ended (step S18), and in a case where it is determined that the automatic tracking of the main subject has not ended, the process proceeds to step S10. Accordingly, the processes from step S10 to step S18 are repeated, and imaging is performed while automatically tracking the main subject.

On the other hand, in a case where it is determined that the tracking of the main subject has ended, the pan and tilt control causing the main subject to be tracked is ended. Further, the determination as to whether or not the automatic tracking of the main subject has ended may be performed according to turning on/off of a power supply or may be performed according to, for example, a switch input for ending a pan and tilt operation. Further, in a case where the main subject is imaged for a still image, an end point of capturing of the still image can be the end of the automatic tracking of the main subject.

Figure 11:
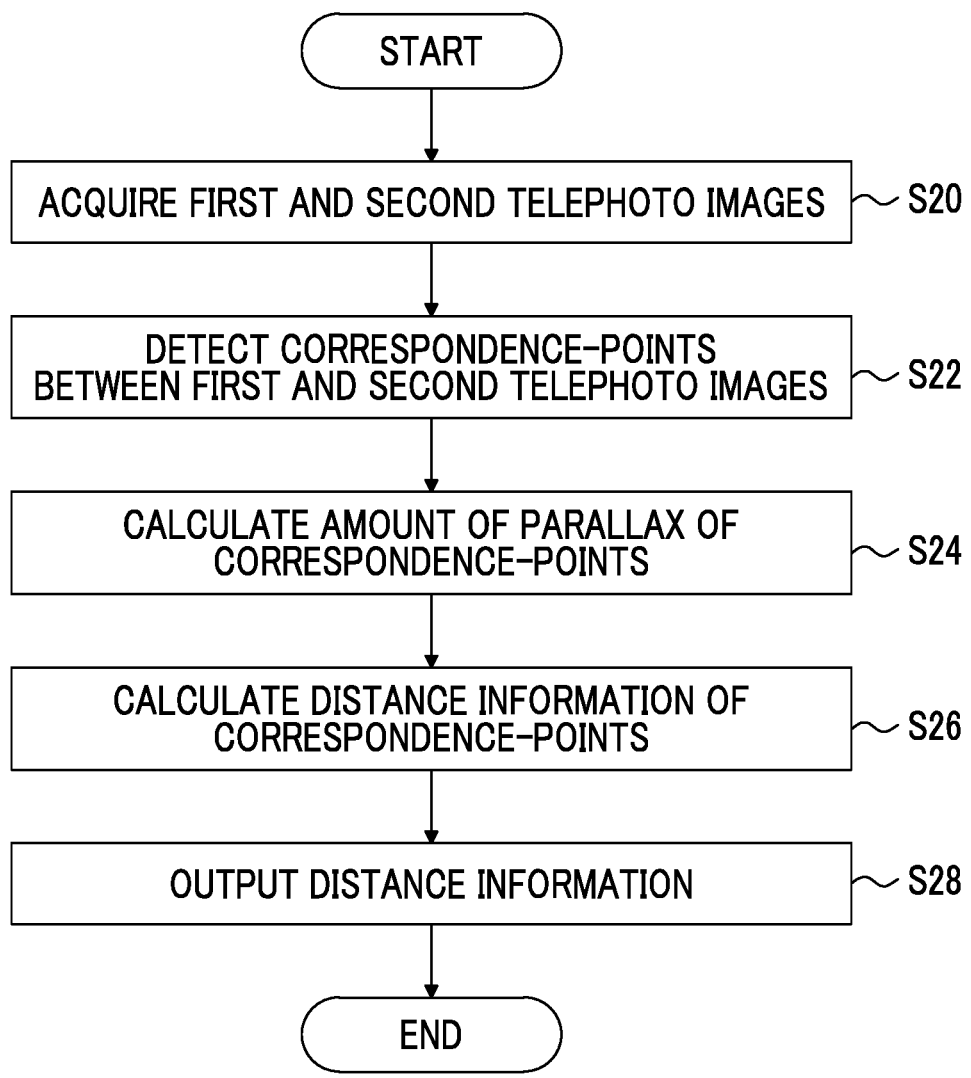
FIG. 11 is a flowchart showing a process of acquiring distance information of correspondence points of which feature quantities match between a first telephoto image and a second telephoto image.

FIG. 11 is a flowchart showing a process of acquiring distance information of correspondence points of which the feature quantities match each other between the first telephoto image and the second telephoto image.

In FIG. 11, in a case where the main subject is captured on the optical axes $L_1$ and $L_2$ of the first imaging optical system 12$_L$ and the second imaging optical system 12$_R$, the first telephoto image is acquired via the first imaging unit 11$_L$ and the first image acquisition unit 22$_L$ and the second telephoto image is acquired via the second imaging unit 11$_R$ and the second image acquisition unit 22$_R$ (step S20).

Subsequently, the correspondence-point detection unit 72$a$ of the amount-of-parallax detection unit 72 detects correspondence points of which the feature quantities match each other between the first telephoto image and the second telephoto image that have been acquired (step S22), and detects the amount of parallax of the two detected correspondence points in the first directivity sensor 17$_L$ and the second directivity sensor 17$_R$ (step S24).

Then, the distance image calculation unit 74 calculates distance information of the correspondence points on the basis of the amount of parallax between the correspondence points calculated in step S26 as described with reference in FIG. 7, the angle information indicating the pan angle and the tilt angle of the first pan and tilt device 30$_L$ and the second pan and tilt device 30$_R$ (information indicating the directions of the optical axes $L_1$ and $L_2$ of the first imaging optical system 12$_L$ and the second imaging optical system 12$_R$), and the baseline length of the first pan and tilt camera 10$_L$ and the second pan and tilt camera 10$_R$ (step S26).

Further, the distance image calculation unit 74 can calculate the distance image by calculating the distance information for each correspondence point of the first telephoto image and the second telephoto image. Further, since the points on the optical axes $L_1$ and $L_2$ of the main subject are also correspondence points, the distance information of the main subject is also calculated, but the amount of parallax of the points on the optical axes $L_1$ and $L_2$ in this case is zero.

The distance information (the distance image) calculated in step S26 is output to and recorded on the distance image recording unit 76 or is output to an external device (step S28).

<Moving Body Detection Method>

Next, an example of a moving body detection method for detecting the main subject (a moving body) in a case where the main subject is a moving body will be described with reference to FIGS. 12 to 14. Since the first subject detection unit 50$_L$ and the second subject detection unit 50$_R$ have the same function as the moving body detection unit, only the first subject detection unit 50$_L$ that can function as the moving body detection unit will be described.

Figure 12:
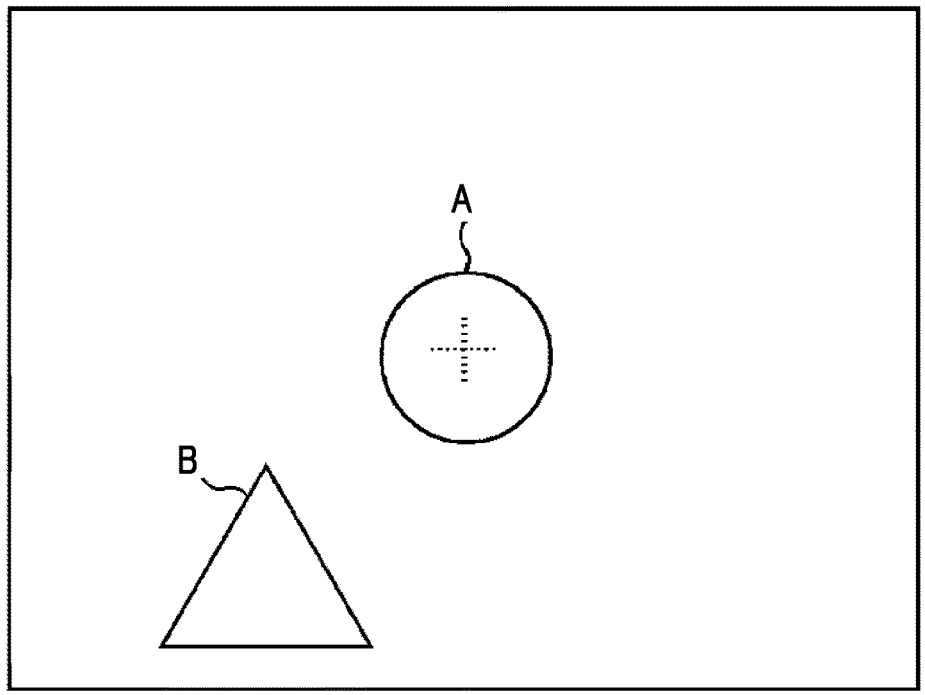
FIG. 12 is a diagram used to describe an example of a moving body detection method for detecting a main subject that is a moving body.
Figure 13:
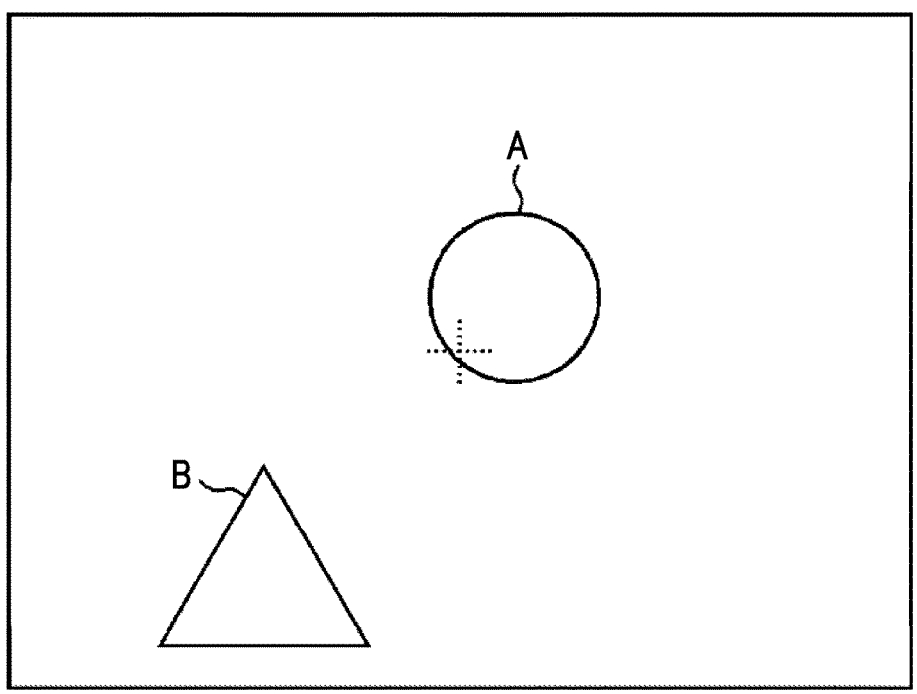
FIG. 13 is a diagram used to describe an example of a moving body detection method for detecting a main subject that is a moving body.

In a case where the first subject detection unit 50$_L$ functions as a moving body detection unit, the first subject detection unit 50$_L$ acquires two first wide angle images in time series (the first wide angle image (FIG. 12) that has been acquired previous time and the first wide angle image (FIG. 13) acquired this time) as illustrated in FIGS. 12 and 13, and detects a difference image (FIG. 14) that is a difference between the two first wide angle images in time series.

In the examples illustrated in FIGS. 12 and 13, among objects A and B, an object A moves, the object B stops, and the object A is the main subject (a moving body).

Figure 14:
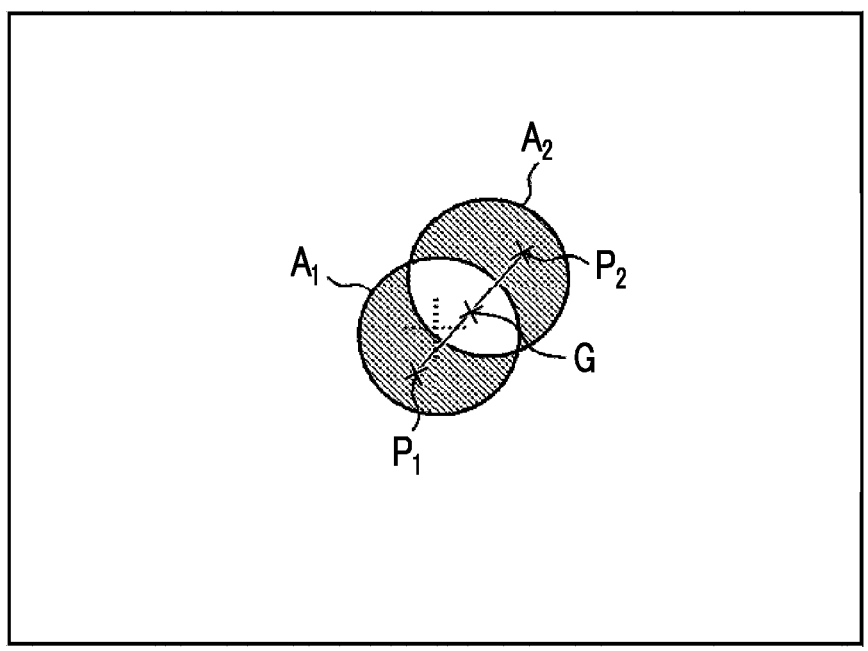
FIG. 14 is a diagram used to describe an example of a moving body detection method for detecting a main subject that is a moving body.

Accordingly, difference images $A_1$ and $A_2$ are images generated due to the movement of the object A, as illustrated in FIG. 14.

Here, centroid positions of the difference images $A_1$ and $A_2$ are calculated, and positions $P_1$ and $P_2$ are set, and a middle point of a line segment connecting these positions $P_1$ and $P_2$ is defined as a position G. This position G is defined as a position of the object A (the main subject which is a moving body) in the first wide angle image.

The object A is moved (converges) to the center position of the first wide angle image (the first telephoto image) by repeatedly controlling the pan and tilt mechanism 32 (that is, the imaging direction of the first imaging unit $11_L$) so that the position G of the object A in the first wide angle image calculated in this way is moved to the center position (a position on the optical axis L1) of the first wide angle image.

In a case where the first imaging unit $11_L$ is moved (moved by the pan and tilt mechanism 32 or moved by mounting the stereo camera 1 on a vehicle), backgrounds are also moved between images in time series, but in this case, it is possible to detect an object A moving in a real space regardless of the movement of the first imaging unit $11_L$ by shifting the image so that the backgrounds match each other between the images in time series and taking a difference image between the images after shifting. Further, the moving body detection method is not limited to the above embodiment.

Another Embodiment of Directivity Sensor

Figure 15:
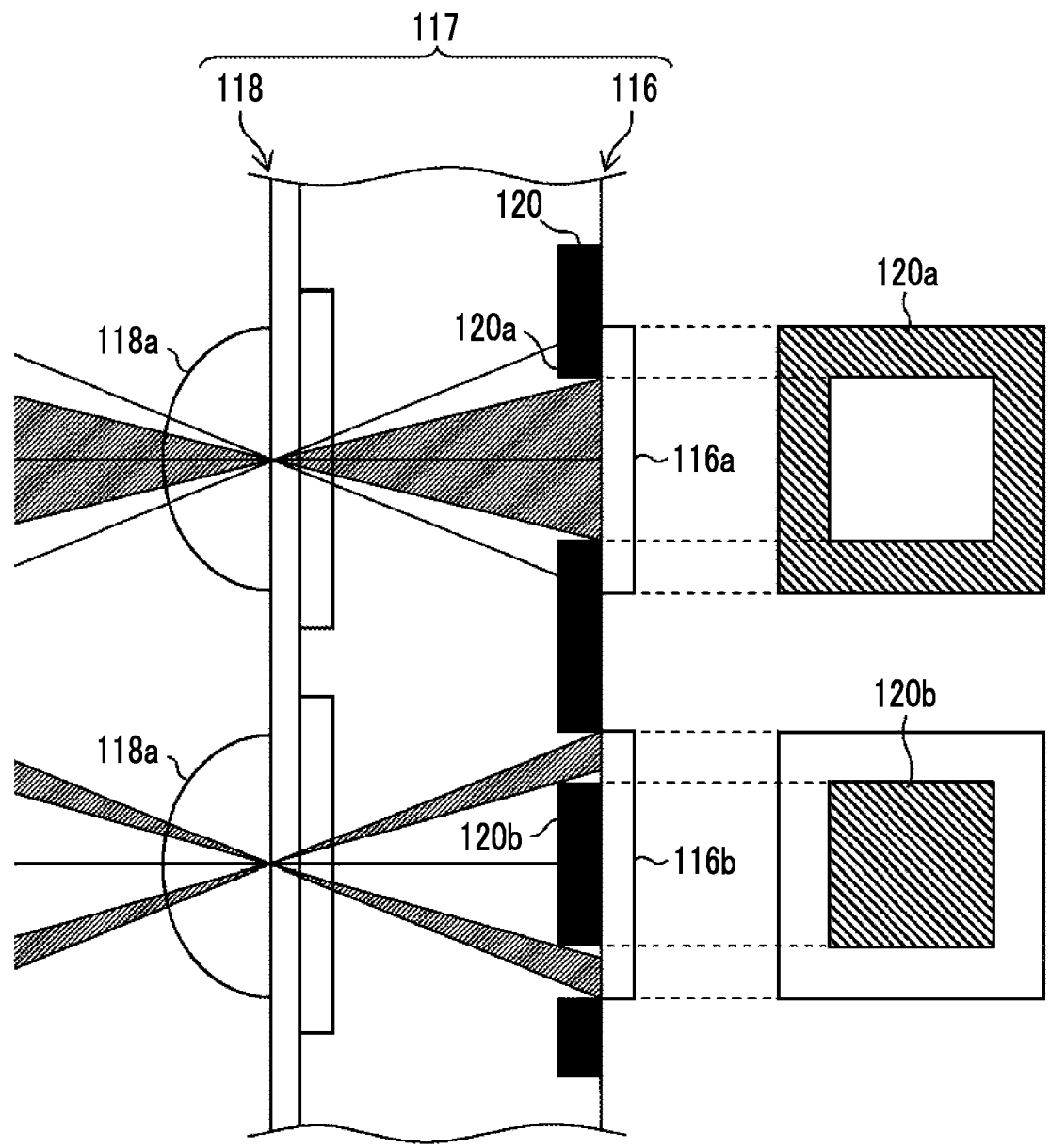
FIG. 15 is a side view illustrating another embodiment of the directivity sensor.

FIG. 15 is a side view illustrating another embodiment of the directivity sensor.

A directivity sensor 117 illustrated in FIG. 15 can be used instead of the first directivity sensor $17_L$ and the second directivity sensor $17_R$.

This directivity sensor 117 includes a microlens array 118 and a light shielding member 120 functioning as a light shielding mask, which form pupil division unit, and an image sensor 116 in which part of light reception cells 116a and 116b are shielded by the light shielding member 120. Further, the light reception cell 116a and the light reception cell 116b, which are partly blocked by the light shielding member 120, are provided alternately (in a checker flag shape) in a horizontal direction and a vertical direction of the image sensor 116.

The microlens array 118 includes microlenses 118a corresponding to the light reception cells 116a and 116b of the image sensor 116 in a one-to-one correspondence.

The light shielding member 120 regulates openings of the light reception cells 116a and 116b of the image sensor 116. The light shielding member 120 has an opening shape corresponding to the wide angle optical system 13 and the telephoto optical system 14 of the first imaging optical system $12_L$ illustrated in FIG. 2.

A light shielding portion 120a of the light shielding member 120 shields a peripheral portion of the opening of the light reception cell 116a, whereas a light shielding portion 120b of the light shielding member 120 shields a central portion of the opening of the light reception cell 116b. Accordingly, a light beam having passed through the wide angle optical system 13 of the first imaging optical system $12_L$ is pupil-divided by the microlens array 118 and the light shielding portion 120a of the light shielding member 120 and is incident on the light reception cell 116a, whereas a light beam having passed through the telephoto optical system 14 of the first imaging optical system $12_L$ is pupil-divided by the microlens array 118 and the light shielding portion 120b of the light shielding member 120 and is incident on the light reception cell 116b.

Accordingly, an image signal of a first wide angle image can be read from each light reception cell 116a of the image sensor 116, and an image signal of a first telephoto image can be read from each light reception cell 116b of the image sensor 116.

Another Embodiment of Imaging Unit

Next, another embodiment of the imaging unit to be applied to the stereo camera according to the present invention will be described.

Figure 16:
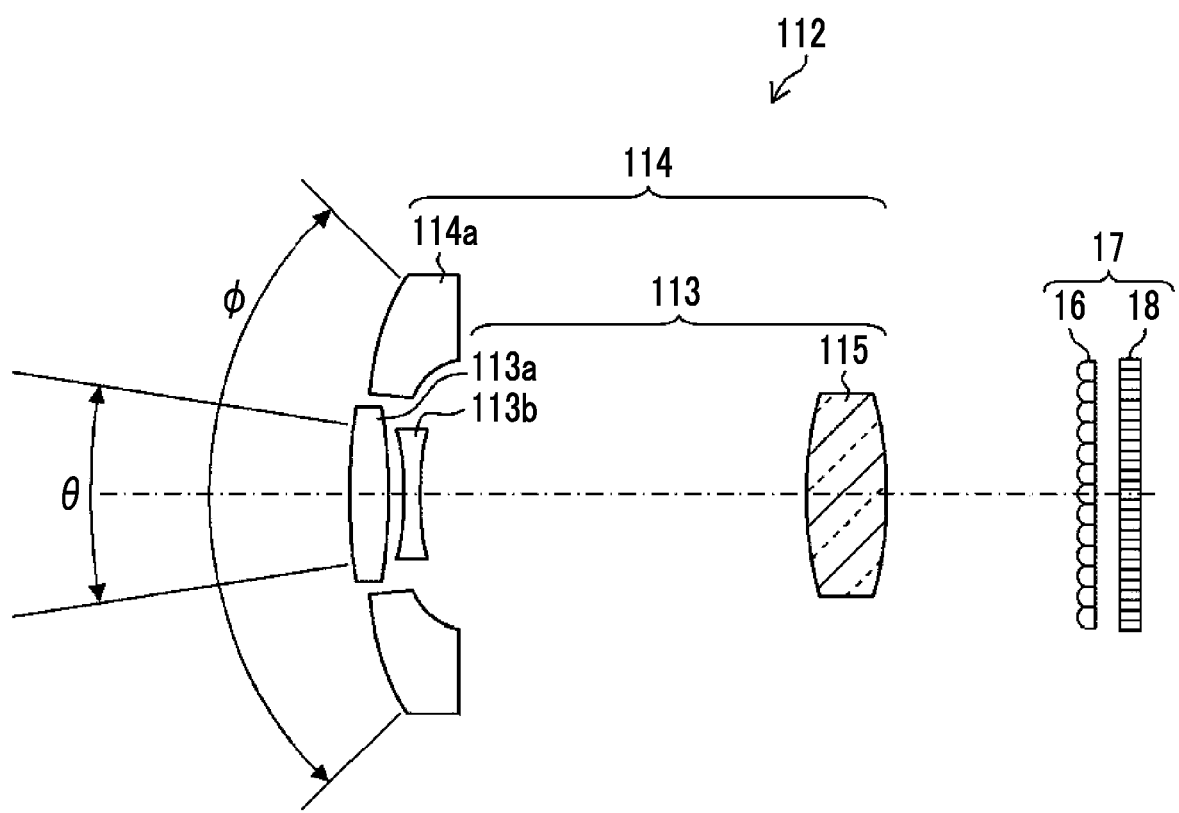
FIG. 16 is a cross-sectional view illustrating another embodiment of the imaging unit applicable to a stereo camera.

FIG. 16 is a cross-sectional view illustrating another embodiment of the imaging unit (the first imaging unit $11_L$ and the second imaging unit $11_R$) applicable to the stereo camera 1.

This imaging unit includes an imaging optical system 112 and a directivity sensor 17. Since the directivity sensor 17 is the same as that illustrated in FIGS. 2 and 3, the imaging optical system 112 will be described below.

The imaging optical system 112 includes a central optical system 113 at a central portion and an annular optical system 114 at the peripheral portion thereof, which are disposed on the same optical axis.

The central optical system 113 is a telephoto optical system including a first lens 113a, a second lens 113b, and a common lens 115, and has an angle of view θ.

The annular optical system 114 is a wide angle optical system including a lens 114a and the common lens 115, and has an angle of view φ (φ>θ). The annular optical system 114 is a wider angle system as compared with the central optical system 113.

This imaging optical system 112 as differs from the first imaging optical system $12_L$ illustrated in FIG. 2 in that the imaging optical system 112 does not use a reflecting mirror, the central optical system 113 is a telephoto optical system, and the annular optical system 114 is a wide angle optical system.

[Others]

In the stereo camera of the embodiment, the pan and tilt mechanism 32 that rotationally moves the first imaging unit $11_L$ and the second imaging unit $11_R$ in the pan direction and the tilt direction is provided in the first camera body $2_L$ and the second camera body $2_R$, but the present invention is not limited thereto, and the first imaging unit $11_L$ and the second imaging unit $11_R$ may be mounted on two electric panhead devices (pan and tilt devices), respectively.

Further, a third subject detection unit and a fourth subject detection unit that detect the main subject from the first telephoto image and the second telephoto image are provided in addition to the first subject detection unit and the second subject detection unit that detect the main subject from the first wide angle image and the second wide angle image. In a case where the main subject is in the first telephoto image and in the second telephoto image, the third subject detection unit and the fourth subject detection unit detect position information of the main subject in the first telephoto image and the second telephoto image, and the pan and tilt control unit (first and second pan and tilt control units) controls the pan and tilt mechanism on the basis of the detected position information of the main subject in the first telephoto image and in the second telephoto image. In a case where the third subject detection unit and the fourth subject detection unit cannot detect the main subject, the pan and tilt mechanism may be controlled on the basis of the position information of the main subject in the first wide angle image and the second wide angle image detected by the first subject detection unit and the second subject detection unit.

Further, the main subject may be initially set by an operator from the wide angle image displayed on the display unit 42 using a touch panel or the like.

Further, the reflecting mirrors constituting the telephoto optical systems 14 of the first imaging optical system $12_L$ and the second imaging optical system $12_R$ are not limited to concave mirrors and convex mirrors, but may be plane mirrors. The number of reflecting mirrors is not limited to two and three or more reflecting mirrors may be provided.

Further, the present invention is not limited to the above-described embodiments, and it is obvious that various modifications can be performed without departing from the spirit of the present invention.

EXPLANATION OF REFERENCES

1: stereo camera
$2_L$: first camera body
$2_R$: second camera body
$4_L$, $4_R$: base
8A: gear
$8_L$, $8_R$: holding unit
$10_L$: first pan and tilt camera
$10_R$: second pan and tilt camera
$11_L$: first imaging unit
$11_R$: second imaging unit
$12_L$: first imaging optical system
$12_R$: second imaging optical system
13: wide angle optical system
13a: first lens
13b: second lens
13c: third lens
13d: fourth lens
14: telephoto optical system
14a: first lens
14b: second lens
14c: first reflecting mirror
14d: second reflecting mirror
15: common Lens
16: microlens array
16a: microlens
17: directivity sensor
$17_L$: first directivity sensor
$17_R$: second directivity sensor
17a: central pupil image
17b: annular pupil image
18: image sensor
18a: light reception cell
19: focus adjustment mechanism
20: A/D converter
22: image acquisition unit
$22_L$: first image acquisition unit
$22_R$: second image acquisition unit
24p: number of frames
$30_L$: first pan and tilt device
$30_R$: second pan and tilt device
30p: number of frames
32: pan and tilt mechanism
34: pan driving unit
36: tilt driving unit
37: holding member
38: pan device
40: digital signal processing unit
42: display unit
44: recording unit
$50_L$: first subject detection unit
$50_R$: second subject detection unit
60: pan and tilt control unit
$60_L$: first pan and tilt control unit
$60_R$: second pan and tilt control unit
62: pan control unit
70: distance information calculation unit
72: amount-of-parallax detection unit
72a: correspondence-point detection unit
74: distance image calculation unit
76: distance image recording unit
112: imaging optical system
113: central optical system
113a: first lens
113b: second lens
114: annular optical system
114a: lens
115: common lens
116: image sensor
116a: light reception cell
116b: light reception cell
117: directivity sensor
118: microlens array
118a: microlens
120: light shielding member
120a: light shielding portion
120b: light shielding portion
190: focus control unit
192: amount-of-parallax detection unit
194: distance information calculation unit
196: in-focus position calculation unit
D: baseline length
L1: optical axis
L2: optical axis
S10 to S28: step
f: focal length
$\Delta x_1$, $\Delta x_2$: amount of parallax
$\alpha_1$, $\alpha_2$: pan angle
$\beta_1$, $\beta_2$, $\gamma_1$, $\gamma_2$: base angle

What is claimed is:

1. A stereo camera comprising:
a first imaging unit including a first imaging optical system including a wide angle optical system and a telephoto optical system having optical axes matching each other and disposed in different regions, and a first directivity sensor having a plurality of pixels that pupil-divide and selectively receive a light beam incident via the wide angle optical system and the telephoto optical system;
a second imaging unit including a second imaging optical system having the same configuration as the first imaging optical system and a second directivity sensor having the same configuration as the first directivity sensor, the second imaging unit being disposed to be spaced from the first imaging unit by a baseline length;
an image acquisition unit that acquires a first wide angle image and a second wide angle image, and a first telephoto image and a second telephoto image from the first directivity sensor and the second directivity sensor;
a pan and tilt mechanism that rotationally moves the first imaging unit and the second imaging unit in a horizontal direction and a vertical direction;
a pan and tilt control unit that controls the pan and tilt mechanism on the basis of the first wide angle image and the second wide angle image acquired by the image acquisition unit so that a main subject is captured on the respective optical axes of the first imaging optical system and the second imaging optical system; and a distance information calculation unit that calculates at least distance information of the main subject on the basis of the first telephoto image and the second telephoto image acquired by the image acquisition unit, wherein the distance information calculation unit includes a correspondence point detection unit that detects two correspondence points of which feature quantities match each other on the basis of the first telephoto image and the second telephoto image, and calculates a distance of the correspondence point on the basis of the amount of parallax in the first directivity sensor and the second directivity sensor of the two correspondence points detected by the correspondence point detection unit, the baseline length, an optical axis direction of the first imaging optical system and the second imaging optical system, and a focal length of the telephoto optical system.

2. The stereo camera according to claim 1,
wherein the first imaging optical system and the second imaging optical system each include the wide angle optical system including a circular central optical system, and the telephoto optical system including an annular optical system disposed concentrically with the central optical system.

3. The stereo camera according to claim 1,
wherein the first directivity sensor and the second directivity sensor each include a microlens array or a light shielding mask that functions as pupil division unit.

4. The stereo camera according to claim 1, further comprising a first focus adjustment unit that performs focus adjustment of the respective telephoto optical systems of the first imaging optical system and the second imaging optical system.

5. The stereo camera according to claim 4,
wherein the first focus adjustment unit acquires distance information of the main subject on the basis of the amount of parallax in the first directivity sensor and the second directivity sensor of the main subject included in the first wide angle image and the second wide angle image acquired by the image acquisition unit, the baseline length, the optical axis directions of the first imaging optical system and the second imaging optical system, and a focal length of the wide angle optical system, and performs focus adjustment of the respective telephoto optical systems of the first imaging optical system and the second imaging optical system on the basis of the acquired distance information.

6. The stereo camera according to claim 4,
wherein when the pan and tilt mechanism is controlled by the pan and tilt control unit and the main subject is captured on the respective optical axes of the first imaging optical system and the second imaging optical system, the first focus adjustment unit acquires the distance information of the main subject on the basis of the baseline length, the optical axis directions of the first imaging optical system and the second imaging optical system, and the focal length of the wide angle optical system, and performs focus adjustment of the respective telephoto optical systems of the first imaging optical system and the second imaging optical system on the basis of the acquired distance information.

7. The stereo camera according to claim 1, further comprising:

a first focus adjustment unit that performs focus adjustment of the respective telephoto optical systems of the first imaging optical system and the second imaging optical system; and a second focus adjustment unit that performs focus adjustment of the respective wide angle optical systems of the first imaging optical system and the second imaging optical system.

8. The stereo camera according to claim 7,
wherein the first focus adjustment unit acquires the distance information of the main subject on the basis of in-focus information of the wide angle optical system from the second focus adjustment unit, and performs focus adjustment of the respective telephoto optical systems of the first imaging optical system and the second imaging optical system on the basis of the acquired distance information.

9. The stereo camera according to claim 1,
wherein the pan and tilt mechanism includes a first pan and tilt mechanism that rotationally moves the first imaging unit in a horizontal direction and a vertical direction, and a second pan and tilt mechanism that rotationally moves the second imaging unit in a horizontal direction and a vertical direction independently of the first pan and tilt mechanism, and the pan and tilt control unit includes a first pan and tilt control unit that controls the first pan and tilt mechanism on the basis of the first wide angle image, and a second pan and tilt control unit that controls the second pan and tilt mechanism on the basis of the second wide angle image.

10. The stereo camera according to claim 9,
wherein the pan and tilt mechanism includes a holding member that holds the first pan and tilt mechanism and the second pan and tilt mechanism, and a pan mechanism that rotationally moves the holding member in the horizontal direction, and the pan and tilt control unit controls the pan mechanism on the basis of the first wide angle image and the second wide angle image so that the first imaging unit and the second imaging unit directly face the main subject.

11. The stereo camera according to claim 1, further comprising:

a first subject detection unit and a second subject detection unit that detect the main subject on the basis of the first wide angle image and the second wide angle image, and the pan and tilt control unit controls the pan and tilt mechanism on the basis of position information of the main subject in the first wide angle image and the second wide angle image detected by the first subject detection unit and the second subject detection unit so that the main subject is captured on the respective optical axes of the first imaging optical system and the second imaging optical system.

12. The stereo camera according to claim 11,
wherein the first subject detection unit and the second subject detection unit detect a moving body on the basis of the first wide angle image and the second wide angle image successively acquired by the image acquisition unit, and set the detected moving body as the main subject.

13. The stereo camera according to claim 11,
wherein the first subject detection unit and the second subject detection unit recognize a specific subject on the basis of the first wide angle image and the second wide angle image and set the recognized specific subject as the main subject.

14. The stereo camera according to claim 11, further comprising:
a third subject detection unit and a fourth subject detection unit that detect the main subject on the basis of the first telephoto image and the second telephoto image,
wherein the pan and tilt control unit controls the pan and tilt mechanism on the basis of the position information of the main subject in the first telephoto image and the second telephoto image detected by the third subject detection unit and the fourth subject detection unit, and controls the pan and tilt mechanism on the basis of position information of the main subject in the first wide angle image and the second wide angle image detected by the first subject detection unit and the second subject detection unit in a case where the main subject cannot be detected by the third subject detection unit and the fourth subject detection unit.

15. A method of controlling a stereo camera using the stereo camera according to claim 1, the method comprising steps of:
acquiring the first wide angle image and the second wide angle image from the first directivity sensor and the second directivity sensor;
controlling the pan and tilt mechanism on the basis of the acquired first wide angle image and the acquired second wide angle image so that the main subject is captured on the respective optical axes of the first imaging optical system and the second imaging optical system;
acquiring the first telephoto image and the second telephoto image from the first directivity sensor and the second directivity sensor in a state where the main subject is captured on the respective optical axes of the first imaging optical system and the second imaging optical system;
calculating at least distance information of the main subject on the basis of the acquired first telephoto image and the acquired second telephoto image;
detecting two correspondence points of which feature quantities match each other on the basis of the first acquired telephoto image and the acquired second telephoto image; and
calculating a distance of the correspondence point on the basis of the amount of parallax in the first directivity sensor and the second directivity sensor of the two detected correspondence points, the baseline length, an optical axis direction of the first imaging optical system and the second imaging optical system, and a focal length of the telephoto optical system.

* * * * *